US011429815B2

United States Patent
Lam et al.

(10) Patent No.: US 11,429,815 B2
(45) Date of Patent: Aug. 30, 2022

(54) METHODS, SYSTEMS, AND MEDIA FOR DEEP NEURAL NETWORK INTERPRETATION VIA RULE EXTRACTION

(71) Applicants: Cho Ho Lam, Coquitlam (CA); Lingyang Chu, Burnaby (CA); Yong Zhang, Markham (CA); Lanjun Wang, Markham (CA)

(72) Inventors: Cho Ho Lam, Coquitlam (CA); Lingyang Chu, Burnaby (CA); Yong Zhang, Markham (CA); Lanjun Wang, Markham (CA)

(73) Assignee: HUAWEI CLOUD COMPUTING TECHNOLOGIES CO., LTD., Gui'an (CN)

( * ) Notice: Subject to any disclaimer, the term of this patent is extended or adjusted under 35 U.S.C. 154(b) by 50 days.

(21) Appl. No.: 17/086,124

(22) Filed: Oct. 30, 2020

(65) Prior Publication Data
US 2022/0138505 A1    May 5, 2022

(51) Int. Cl.
*G06K 9/62*    (2022.01)
*G06N 3/08*    (2006.01)

(52) U.S. Cl.
CPC ......... *G06K 9/6262* (2013.01); *G06K 9/6269* (2013.01); *G06N 3/08* (2013.01)

(58) Field of Classification Search
CPC ....... G06K 9/6262; G06K 9/6269; G06N 3/08
USPC ........................................................ 382/157
See application file for complete search history.

(56) References Cited

U.S. PATENT DOCUMENTS

| | | | | |
|---|---|---|---|---|
| 2008/0233576 | A1* | 9/2008 | Weston | G06N 20/10 707/999.005 |
| 2018/0350459 | A1 | 12/2018 | Yang | |
| 2021/0142152 | A1* | 5/2021 | Burkhart | G06N 3/0454 |
| 2021/0342652 | A1* | 11/2021 | Glassman | G06K 9/623 |

FOREIGN PATENT DOCUMENTS

| | | |
|---|---|---|
| CN | 111401472 A | 7/2020 |
| CN | 111553462 A | 8/2020 |

(Continued)

OTHER PUBLICATIONS

Selvaraju, "Grad-CAM: Visual Explanations from Deep Networks via Gradient-based Localization" aiXiv Dec. 3, 2019. (Year: 2019).*

(Continued)

*Primary Examiner* — Juan A Torres

(57) ABSTRACT

Methods, systems and media for deep neural network interpretation via rule extraction. The interpretation of the deep neural network is based on extracting one or more rules approximating classification behavior of the network. Rules are defined by identifying a set of hyperplanes through the data space that collectively define a convex polytope that separates a target class of input samples from input samples of different classes. Each rule corresponds to a set of decision boundaries between two different decision outcomes. Human-understandable representations of rules may be generated. One or more rules may be used to generate a classifier. The representations and interpretations exhibit faithfulness, robustness, and comprehensiveness relative to other known approaches.

20 Claims, 13 Drawing Sheets

(56) References Cited

FOREIGN PATENT DOCUMENTS

| CN | 111652350 A | 9/2020 |
|---|---|---|
| CN | 111695590 A | 9/2020 |

OTHER PUBLICATIONS

Ribeiro, "Why should I trust you?: Explaining the predictions of any classifier" Knowledge Discovery and Data Mining (KDD) Aug. 9, 2016. (Year: 2016).*
Ribeiro, "Anchors: High-precision model-agnostic explanations". AAAI Conference on Artificial Intelligence, 2018 (Year: 2018).*
Fong, "Interpretable explanations of black boxes by meaningful perturbation". arXiv preprint arXiv:1704.03296, Jan. 10, 2018. (Year: 2018).*
Karen Simonyan and Andrew Zisserman, "Very Deep Convolutional Networks for Large-Scale Image Recognition", 2014, arXiv:1409.1556 [cs.CV].
M. T. Ribeiro, S. Singh, and C. Guestrin. Anchors: High-precision model-agnostic explanations. AAAI Conference on Artificial Intelligence, 2018.
R. R. Selvaraju, M. Cogswell, A. Das, R.a Vedantam, D. Parikh and D. Batra. Grad-CAM: Visual explanations from deep networks via gradient-based localization. Int J Comput Vis 128, 336-359 (2020).
M. T. Ribeiro, S. Singh, and C. Guestrin. "Why should I trust you?": Explaining the predictions of any classifier. Knowledge Discovery and Data Mining (KDD) 2016.
R. C. Fong and A. Vedaldi. Interpretable explanations of black boxes by meaningful perturbation. In arXiv:1704.03296, 2017.

* cited by examiner

611

Identify number of updated positive samples outside of the convex polytope and number of updated negative samples outside of the convex polytope
642

Formulate combinatorial optimization problem
644

Solve combinatorial optimization problem using greedy algorithm
646

Tighten rule by adding columns
648

Loosen rule by removing columns
650

FIG. 6C

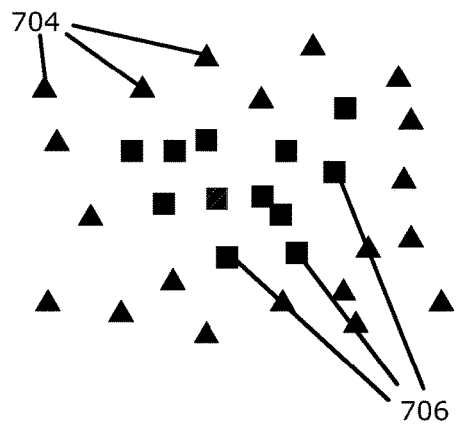
FIG. 7A
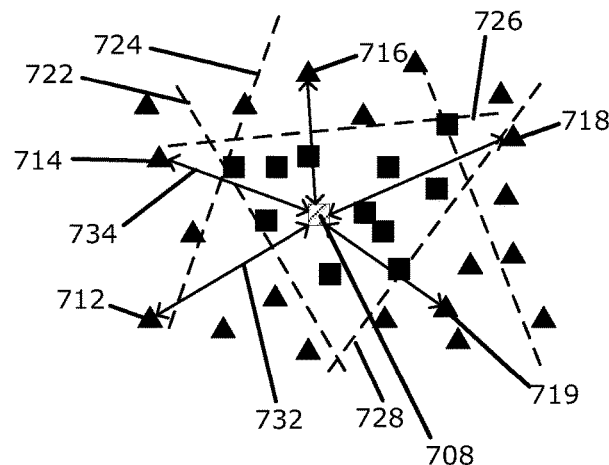
FIG. 7B
FIG. 7C
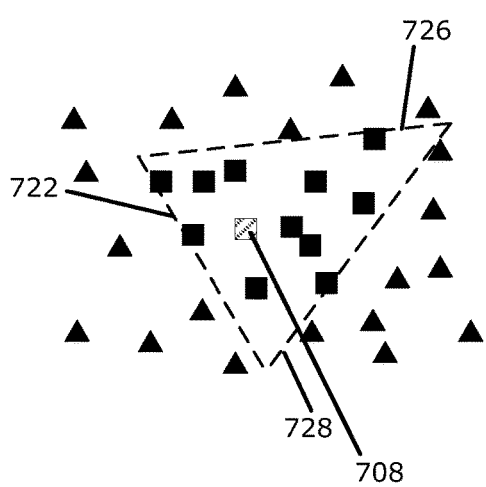
FIG. 7D

METHODS, SYSTEMS, AND MEDIA FOR DEEP NEURAL NETWORK INTERPRETATION VIA RULE EXTRACTION

FIELD

The present disclosure relates to artificial neural networks, including deep learning neural networks and the interpretation and representation thereof.

BACKGROUND

Artificial neural networks are computational structures used for predictive modelling. A neural network typically includes multiple layers of neurons, each neuron receiving inputs from a previous layer, applying a set of weights to the inputs, and combining these weighted inputs to generate an output, which is in turn provided as input to one or more neurons of a subsequent layer.

A layer of neurons uses filters to define the relationship between the outputs of the neurons of the previous layer and the outputs of the neurons of the current layer. A layer of the neural network receives a data input, usually in the form of a data array of known dimensions: in the case of neural networks operating on 2D data such as image data, the data input to a layer of the network is generally a 3D array consisting of a set of multiple 2D input activation maps (also called input feature maps or input channels). By applying the set of filters to the set of input activation maps, the layer generates a data output, which is typically a data array having known dimensions: again, in the case of neural networks operating on 2D data, the data output of a layer of the network is generally a 3D array consisting of a set of multiple 2D output activation maps (also called output feature maps or output channels).

Deep neural networks (DNNs) are a particular type of neural network trained using deep learning techniques. DNNs have achieved tremendous success over the last decade in a wide range of tasks. However, despite the capability of DNNs, they are mostly treated as black-box models—the interior logic of a DNN is typically opaque or incomprehensible to humans. The lack of human-understandable interpretation of DNNs has made it difficult to promote the use of artificial intelligence (AI) systems in risk-sensitive domains like healthcare, finance, and security.

Thus, there exists a need to communicate to human users, especially non-experts, information regarding the nature of the decision-making occurring inside DNNs to reassure them of the safety and reliability of deploying DNNs for various critical applications. In order to communicate meaningful information regarding the inner workings of a DNN, the model embodied by the DNN must be interpreted.

Interpretation has a very broad range of meanings in the relevant literature. In some contexts it may include the generation or presentation of human-understandable indications of factors such as the reliability and/or transparency of the DNN. Reliability means that the model embodied in the DNN makes decisions based on reliable features and sound logic. Transparency is a means of establishing trust between the model and the user. A correct decision alone may not be sufficient to convince the user to use and rely upon the model; the user may also need to know how a decision is made.

These factors (reliability and transparency) are critically important for certain domains in which AI may be deployed. A first example is the domain of medical diagnosis. Medical doctors often need to make diagnoses based on medical images of the patient. DNNs can achieve remarkable accuracy in this domain, but it may be risky to recommend treatments or surgeries if the reasoning of the DNN is not accessible to the doctor. The doctor may wish to know, for example, which part of the image has triggered the decision making; a DNN capable of identifying which portion of the image was particularly relevant or salient to its decision would allow a doctor to assess the soundness of the DNN's reasoning. The doctor could also double-check the diagnosis with reference to the indicated portion of the image.

A second example is the domain of autonomous vehicles. An AI-powered self-driving car may need to identify objects it sees in the road environment. For example, when the car sees a stop-sign, it's important for a user or developer to know whether the car truly understands the instruction to "STOP" based on the letters shown on the sign, or whether the car is basing its decision on memorized, unreliable features like the color or shape of the sign.

Various approaches to DNN interpretation have been made in the research literature. Gradient-weighted Class Activation Mapping (Grad-CAM) is an approach described by Ramprasaath R. Selvaraju, Michael Cogswell, Abhishek Das, Ramakrishna Vedantam, Devi Parikh and Dhruv Batra. "Grad-CAM: Visual Explanations from Deep Networks via Gradient-based Localization". *Int J Comput Vis* 128, 336-359 (2020). Based on a sample image provided as the input to the neural network, a set of output feature maps of a penultimate layer of the neural network are multiplied by an average of the gradients of the output feature maps, and the results are added to generate a heatmap. However, the gradients involved only apply to a small region within the input image, potentially rendering the interpretation unreliable. In addition, Grad-CAM provides no information on the decision logic of the model, and only returns one explanation or interpretation even if multiple factors contributed to the decision. Furthermore, it can only interpret one image at a time; the faithfulness and robustness of such interpretations are therefore questionable.

A second approach, Local Interpretable Model-Agnostic Explanations (LIME), is described by Ribeiro, M. T.; Singh, S.; and Guestrin, C. "'Why should I trust you?': Explaining the predictions of any classifier". *Knowledge Discovery and Data Mining (KDD)* 2016. In LIME, a sample image is segmented into multiple parts (called "super-pixels"), and the image classification performed by a neural network model is performed on perturbed versions of the sample image with the image data for some super-pixels removed. A loss function is minimized to compute an interpretable version of the neural network model. LIME has several drawbacks. The perturbed images cannot fully simulate natural images, and this may affect the credibility of the confidence of the neural network model. LIME provides no information on the decision logic of the neural network model because it is model-agnostic. Furthermore, the applicable range of a LIME explanation is impractically small, bringing its faithfulness into question. LIME may not be robust due to the use of image segmentation and sampling, an effect that has been demonstrated in other techniques. Finally, like Grad-CAM, LIME only returns one explanation even if multiple factors contributed to the decision.

A third approach, similar in some ways to LIME, is called an Anchor approach and is described by Ribeiro, M. T.; Singh, S.; and Guestrin, C. "Anchors: High-precision model-agnostic explanations". *AAAI Conference on Artificial Intelligence,* 2018. In this approach, an "anchor" is identified in the image using a similar segmentation-and-perturbation approach to LIME. In this context, and "anchor" refers to a set of super-pixels such that, no matter what was shown by the other pixels of the image, the model's prediction would not change. An anchor is identified with the largest coverage using a bottom-up construction or a beam search. The Anchor approach also has a number of drawbacks, many of which it shares with LIME. The applicable images for an anchor cannot fully simulate natural images, and this may affect the credibility of the model confidence. The Anchor approach provides no information on the decision logic of the model, since it is model-agnostic. The applicable range of an Anchor approach explanation may be impractically small, and hence its faithfulness is questionable. The Anchor approach is not robust due to the use of image segmentation. Finally, like LIME and Grad-CAM, this approach only returns one explanation, even if multiple factors contributed to the decision.

A fourth approach, called a Meaningful Perturbation approach or a Mask approach, is described by R. C. Fong and A. Vedaldi. "Interpretable explanations of black boxes by meaningful perturbation". *arXiv preprint* arXiv: 1704.03296, 2017. A mask is used to apply perturbation to a sample image, the mask being defined by a natural masking operation such as constant, noise, or blur. An objective function is minimized through gradient descent optimization, the objective function being a weighted sum of a number of image pixels, the confidence after the mask is applied, and a total-variation norm of the mask. The optimized mask should cover the pixels of the image that are most relevant to the decision of the model. The Mask approach also exhibits a number of drawbacks. The masked images cannot fully simulate natural images, and this may affect the credibility of the model confidence. The Mask approach provides no information on the decision logic of the model. The Mask approach can only interpret one image at a time, calling the faithfulness and robustness of such interpretations into question. Finally, like the other approaches described above, the Mask approach only returns one explanation even if multiple factors contributed to the decision.

Thus, there exists a need for a technique for interpreting the decision-making of deep neural networks that overcomes one or more of the shortcomings of the existing approaches described above.

SUMMARY

In various examples, the present disclosure describes methods, systems, and computer-readable media for deep neural network interpretation via rule extraction. The interpretation of the deep neural network is based on extracting one or more rules whereby the deep neural network makes decisions, each rule corresponding to a set of decision boundaries between two different decision outcomes. In some examples, a human-understandable representation of one or more of the rules may be generated, allowing human users to view or otherwise comprehend the nature of the rules as applied to a given input sample. In some examples, one rule or multiple rules may be used to generate a classifier. Experimental data comparing the example embodiments described herein to other known approaches to deep neural network interpretation demonstrates that the presently disclosed embodiments exhibit faithfulness, robustness, and comprehensiveness relative to other known approaches. Furthermore, certain embodiments provide interpretation methods that can be used before a neural network is fully trained, such as while the neural network is being fine-tuned.

As used herein, the term "model" may refer to a mathematical or computational model. A model may be said to be implemented, embodied, run, or executed by an algorithm, computer program, or computational structure or device. In the present example embodiments, a model may refer to a predictive model intended to model human perception or interpretation of input such as images, and may be implemented by an algorithm trained using deep learning techniques, such as a deep neural network (DNN). The terms DNN, deep neural network, neural network, artificial neural network, and network may be used interchangeably herein unless indicated otherwise.

An activation map or feature map may refer to an input (e.g., "input activation map") or output (e.g., "output activation map") of a layer of an artificial neural network. A layer of a neural network may receive multiple input activation maps as inputs and may produce multiple output activation maps as outputs.

An "input sample" may refer to any data sample used as an input to a neural network, such as image data. It may refer to a training data sample used to train a neural network, or to a data sample provided to a trained neural network which will infer (i.e. predict) an output based on the data sample for the task for which the neural network has been trained. Thus, for a neural network that performs a task of image classification, an input sample may be a single digital image.

An "updated input sample", as referred to herein, refers to a collection of data generated by a trained neural network, or a portion of a trained neural network, based on a received input sample. In some examples, it may refer to a set of output activation maps produced by a layer of a trained DNN based on a single input sample provided to the DNN as an input. In some examples, as further described below with reference to FIG. 6, an updated sample may be an input sample.

As used herein, a statement that an element is "for" a particular purpose may mean that the element performs a certain function or is configured to carry out one or more particular steps or operations, as described herein.

As used herein, statements that a second element is "based on" a first element may mean that characteristics of the second element are affected or determined at least in part by characteristics of the first element. The first element may be considered an input to an operation or calculation, or a series of operations or computations, which produces the second element as an output that is not independent from the first element.

As used herein, a "representation", "simplified representation", "interpretation", or "human-understandable representation" of a neural network, model, or decision boundary may refer to a human-perceptible (e.g., visual) representation of data or a simplified data structure that approximates or corresponds to a more complex structure or behavior of the neural network, model, or decision boundary being represented. A "representation" or "simplified representation" of a neural network, model, or decision boundary may also refer to a simplified model or classifier that approximates the behavior of a more complex neural network, model, or decision boundary. By generating a simplified representation of a model (e.g., an inference model implemented by a deep neural network), embodiments described herein may thereby generate a simplified classifier approximating the behavior of the more complex model being represented, and/or generate a human-understandable representation of the model being represented. Unless otherwise indicated, "DNN Representation" refers to generating rules or classifiers that approximate the behavior of the DNN, whereas "DNN Interpretation" refers to generation of human-understandable representations of the behavior of the DNN.

As used herein, the terms "classification" and "categorization" are used interchangeably and synonymously (as are "classify" and "categorize", "class and "category", "classifier" and "categorizer", etc.). In some examples, the behavior of a classification model may be described as classifying an input sample into a first category or a second category; it will be appreciated that each of the first and second category may include multiple categories, e.g., the first category may be "dog" whereas the second category may include multiple categories (e.g., "cat", "human", and "truck"), none of which are "dog", such that the second category may be regarded as "not dog".

In some aspects, the present disclosure describes a method for generating a simplified representation of a neural network trained to perform image classification on input samples. The neural network comprises a truncated portion including one or more layers and a tail portion including one or more layers. The method comprises a step of using the truncated portion to generate an updated input sample comprising one or more output activation maps based on the input sample. The method comprises a step of using the tail portion to generate a label classifying the input sample into a first category or a second category based on the one or more output activation maps. The method comprises a step of generating a rule, the rule comprising a convex polytope defined by a plurality of hyperplanes in a multi-dimensional Euclidean space defined based on the plurality of updated samples such that updated input samples falling within the convex polytope are likely to be classified in a first category by the trained neural network and updated input samples falling outside the convex polytope are likely to be classified in a second category by the trained neural network. In some aspects, the present disclosure describes a system. The system comprises a processing system. The processing system comprises one or more processor devices, and a memory storing instructions. The instructions, when executed by the processing system, cause the system to carry out a number of steps. The system generates a simplified representation of a trained neural network trained to perform image classification on input samples. The trained neural network comprises a truncated portion including one or more layers and a tail portion including one or more layers. The simplified representation of a trained neural network is generated by using the truncated portion to generate an updated input sample comprising one or more output activation maps based on the input sample. The simplified representation of a trained neural network is further generated by using the tail portion to generate a label classifying the input sample into a first category or a second category based on the one or more output activation maps. The simplified representation of a trained neural network is further generated by generating a rule, the rule comprising a convex polytope defined by a plurality of hyperplanes in a multi-dimensional Euclidean space defined based on the plurality of updated samples such that updated input samples falling within the convex polytope are likely to be classified in a first category by the trained neural network and updated input samples falling outside the convex polytope are likely to be classified in a second category by the trained neural network.

In some examples, the plurality of input samples comprises a seed sample classified by the trained neural network in the first category. The truncated portion generates an updated seed sample based on the seed sample and a number of contrasting input samples equal to a predetermined candidate pool size. Each contrasting input sample is classified by the trained neural network in the second category. The truncated portion generates an updated contrasting sample based on each contrasting input sample. Generating the rule comprises, for each updated contrasting sample, performing a binary search between the updated seed sample and the updated contrasting sample to generate a basis value and a bias value. Generating the rule also comprises, for each updated contrasting sample, calculating a decision boundary between the first category and the second category based on the basis value and the bias value of the binary search. The decision boundary defines one of the plurality of hyperplanes.

In some examples, the plurality of input samples further comprises one or more positive samples and one or more negative samples. Each positive sample is classified by the trained neural network in the first category. The truncated portion generates an updated positive sample based on each positive sample. Each negative sample is classified by the trained neural network in the second category. The truncated portion generates an updated negative sample based on each negative sample. Generating the rule further comprises, for each hyperplane, generating a positive-sample binary matrix. The positive-sample binary matrix comprises, for each updated positive sample, a row of binary values. Each binary value indicates whether the updated positive sample falls on a first side or second side of one of the hyperplanes. Each column of the positive-sample binary matrix corresponds to a hyperplane. Generating a negative-sample binary matrix comprises, for each updated negative sample, a row of binary values. Each binary value indicates whether the updated negative sample falls on a first side or second side of one of the hyperplanes. Each column of the negative-sample binary matrix corresponds to a hyperplane. Generating the rule further comprises selecting the plurality of hyperplanes from the columns of the positive-sample binary matrix and the columns of the negative-sample binary matrix using submodular cost submodular cover optimization such that the number of hyperplanes in the plurality of hyperplanes defining the convex polytope of the rule is less than the predetermined candidate In some examples, the positive-sample binary matrix further comprises a row of binary values corresponding to the updated seed sample, and the negative-sample binary matrix further comprises a row of binary values corresponding to each updated contrasting sample.

In some examples, the plurality of input samples comprises an interpretation sample classified by the trained neural network in the first category. The truncated portion generates an updated interpretation sample based on the interpretation sample. The method further comprises generating an interpretation of the rule. The rule is generated by identifying a hyperplane of the plurality of hyperplanes of the rule. The rule is further generated by, for each of one or more activation maps of the updated interpretation sample, each activation map comprising a plurality of activation values, calculating a mean of the partial derivatives of the hyperplane with respect to each activation value of the activation map, and setting a weight for the activation map equal to the calculated mean. The rule is further generated by generating a heatmap by calculating a sum of each activation map weighted by its respective weight, the heatmap representing a decision boundary corresponding to the hyperplane.

In some examples, each input sample is an image. The method further comprises generating a human-visible representation of the rule by combining the heatmap with the interpretation sample.

In some examples, combining the heatmap with the interpretation sample comprises generating an image comprising at least part of the interpretation sample with a visual indicator of a portion of the heatmap having a heat value above a salience threshold.

In some examples, generating a representation of the rule further comprises repeating the steps of identifying a hyperplane, calculating a mean for each activation map, setting a weight for each activation map, and generating a heatmap for each one or more of the remaining hyperplanes of the convex polytope of the rule.

In some examples, the steps of generating an updated sample and generating a label are performed for each input sample of a first plurality of input samples to generate a first plurality of updated samples and a first plurality of labels. The step of generating a rule is performed based on the first plurality of updated samples and a first plurality of labels, thereby generating a first rule. The steps of generating an updated sample and generating a label are performed for each input sample of each of one or more additional pluralities of input samples to generate one or more additional pluralities of updated samples and one or more additional pluralities of labels. The step of generating a rule is performed based on one or more additional pluralities of updated samples and one or more additional pluralities of labels, thereby generating one or more additional rules, the first rule and the one or more additional rules jointly constituting a plurality of rules. The method further comprises generating a multiple rule classifier comprising the plurality of rules.

In some aspects, the present disclosure describes a computer-readable medium having instructions tangibly stored thereon, wherein the instructions, when executed by a processing system, cause the processing system to perform the method steps described above.

BRIEF DESCRIPTION OF THE DRAWINGS

Reference will now be made, by way of example, to the accompanying drawings which show example embodiments of the present application, and in which:

FIG. 6C is a flowchart of an example method for optimizing the binary matrices of the method of FIG. 6A.

FIG. 7A is a two-dimensional visualization of a data space showing input samples by category including a seed sample, in accordance with the present disclosure.

FIG. 7B is the two-dimensional visualization of FIG. 7A, showing a plurality of decision boundaries between input sample categories, in accordance with the present disclosure.

FIG. 7C is a pair of binary matrices representing the plurality of decision boundaries of FIG. 7B, in accordance with the present disclosure.

FIG. 7D is the two-dimensional visualization of FIG. 7A, showing a rule defined by a subset of the plurality of decision boundaries of FIG. 7B, in accordance with the present disclosure.

Similar reference numerals may have been used in different figures to denote similar components.

DESCRIPTION OF EXAMPLE EMBODIMENTS

Figure 1A:
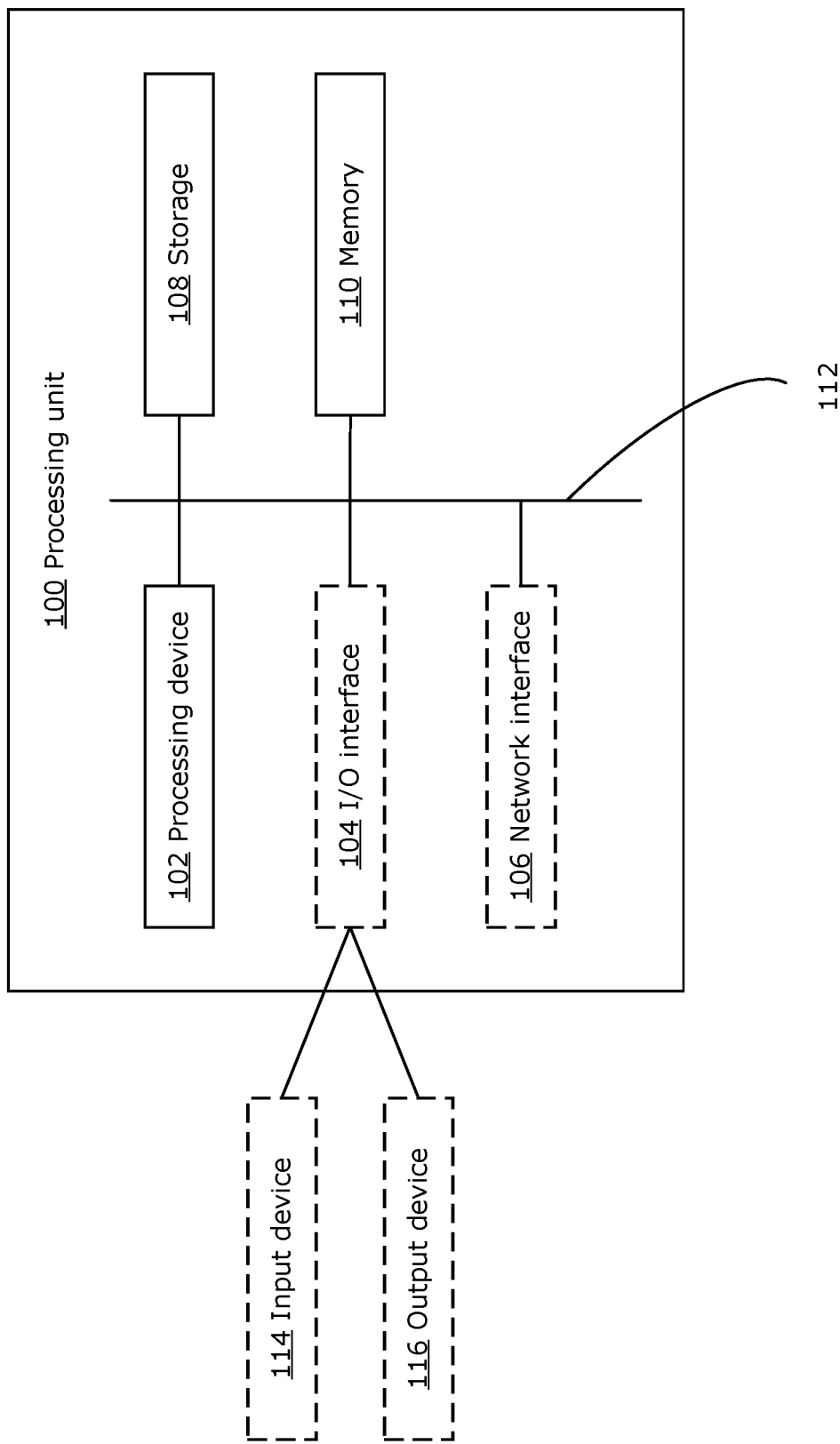
FIG. 1A is a block diagram of an example processing system that may be used to implement examples described herein.

Methods, systems, and computer-readable media for deep neural network interpretation via rule extraction will now be described with reference to example embodiments. The interpretation of the deep neural network is based on extracting one or more rules whereby the network makes decisions, each rule corresponding to a decision boundary between two different decision outcomes. In some examples, a human-understandable representation of one or more of the rules may be generated, allowing human users to view or otherwise comprehend the nature of the rules as applied to a given input sample. In some examples, one rule or multiple rules may be used to generate a classifier.

Some embodiments described herein may exhibit faithfulness, robustness, and comprehensiveness relative to other known approaches. Faithfulness means that the interpretation of the neural network accurately describes the model's behavior locally, with the possibility to combine several local explanations to form one global representation of the model. Example embodiments described herein may be based on the decision boundaries of the model, and hence may describe the model's behavior accurately. Robustness means that the interpretation is robust against minor changes in the input sample, model parameters, interpretation hyperparameters, and adversarial attacks. Example embodiments described herein may be robust against changes that have little impact on the model's decision, e.g. mild transformation in the input image, fine-tuned model parameters, interpretation hyperparameters, or even adversarial attacks. Comprehensiveness means that the interpretation identifies all major factors that contribute to the model's decision.

Example embodiments described herein may consider multiple decision boundaries and interpret all of them.

Some embodiments provide interpretation methods that can be used before a neural network is fully trained, such as while the neural network is being fine-tuned. Existing approaches to DNN interpretation typically require the weight values of the DNN to converge (i.e., the value of the loss function applied during training to be small) before a meaningful interpretation can be generated. However, some embodiments described herein may allow a representation or interpretation of the DNN to be generated while the DNN is still being fine-tuned and the weight values have not yet converged.

Example embodiments described herein may include a rule extraction method that generates a rule corresponding to a relatively small number of decision boundaries within the space of possible inputs. Some embodiments may supplement the first rule with one or more additional rules to further define the decision boundaries within the space of possible inputs, using a multi-rule extraction method. Some embodiments may generate a human-understandable representation of one or more of the decision boundaries of one or more of the rules using a model interpretation method, thereby enabling a human user to understand the basis for the decisions made by the neural network with respect to a given input sample.

Example embodiments will be described herein with reference to deep neural networks (DNNs) that are trained using supervised learning for a particular interference task. After being trained, the trained DNN is used to perform the particular inference task such as object classification using image data as inputs. However, it will be appreciated that the techniques described herein are potentially applicable to the training of a variety of artificial neural networks to perform a variety of inference tasks using supervised or unsupervised learning using a variety of input sample types.

The context in which example embodiments may operate will now be described with reference to FIGS. 1A-1C.

Example Computing System

A system or device, such as a computing system, that may be used in examples disclosed herein is first described.

FIG. 1A a block diagram of an example simplified computing system 100, which may be a device that is used to train a convolutional neural network in accordance with examples disclosed herein or to execute the instructions of a trained deep neural network to perform the specific task for which the deep neural network has been trained (e.g. image classification, object recognition, etc.). Other computing system suitable for implementing embodiments described in the present disclosure may be used, which may include components different from those discussed below. In some examples, the computing system may be implemented across more than one physical hardware unit, such as in a parallel computing, distributed computing, virtual server, or cloud computing configuration. Although FIG. 1A shows a single instance of each component, there may be multiple instances of each component in the computing system 100.

The computing system 100 may include one or more processing units 102, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 100 may also include one or more optional input/output (I/O) interfaces 104, which may enable interfacing with one or more optional input devices 114 and/or optional output devices 116. In the example shown, the input device(s) 114 (e.g., a keyboard, a mouse, a microphone, a touchscreen, and/or a keypad) and output device(s) 116 (e.g., a display, a speaker and/or a printer) are shown as optional and external to the computing system 100. In other examples, one or more of the input device(s) 114 and/or the output device(s) 116 may be included as a component of the computing system 100. In other examples, there may not be any input device(s) 114 and output device(s) 116, in which case the I/O interface(s) 104 may not be needed.

The computing system 100 may include one or more optional network interfaces 106 for wired or wireless communication with a network (e.g., an intranet, the Internet, a P2P network, a WAN and/or a LAN) or other node. The network interfaces 106 may include wired links (e.g., Ethernet cable) and/or wireless links (e.g., one or more antennas) for intra-network and/or inter-network communications.

The computing system 100 may also include one or more storage units 108, which may include a mass storage unit such as a solid state drive, a hard disk drive, a magnetic disk drive and/or an optical disk drive. The computing system 100 may include one or more memories 110, which may include a volatile or non-volatile memory (e.g., a flash memory, a random access memory (RAM), and/or a read-only memory (ROM)). The non-transitory memory(ies) 110 may store instructions for execution by the processing device(s) 102, such as to carry out examples described in the present disclosure. The memory(ies) 110 may include other software instructions, such as for implementing an operating system and other applications/functions. In some examples, memory 110 may include software instructions for execution by the processing device 102 to train a neural network and/or to implement a trained neural network, as disclosed herein.

In some other examples, one or more data sets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 112 providing communication among components of the computing system 100, including the processing device(s) 102, optional I/O interface(s) 104, optional network interface(s) 106, storage unit(s) 108 and/or memory(ies) 110. The bus 112 may be any suitable bus architecture including, for example, a memory bus, a peripheral bus or a video bus.

Example Deep Neural Network

Figure 1B:
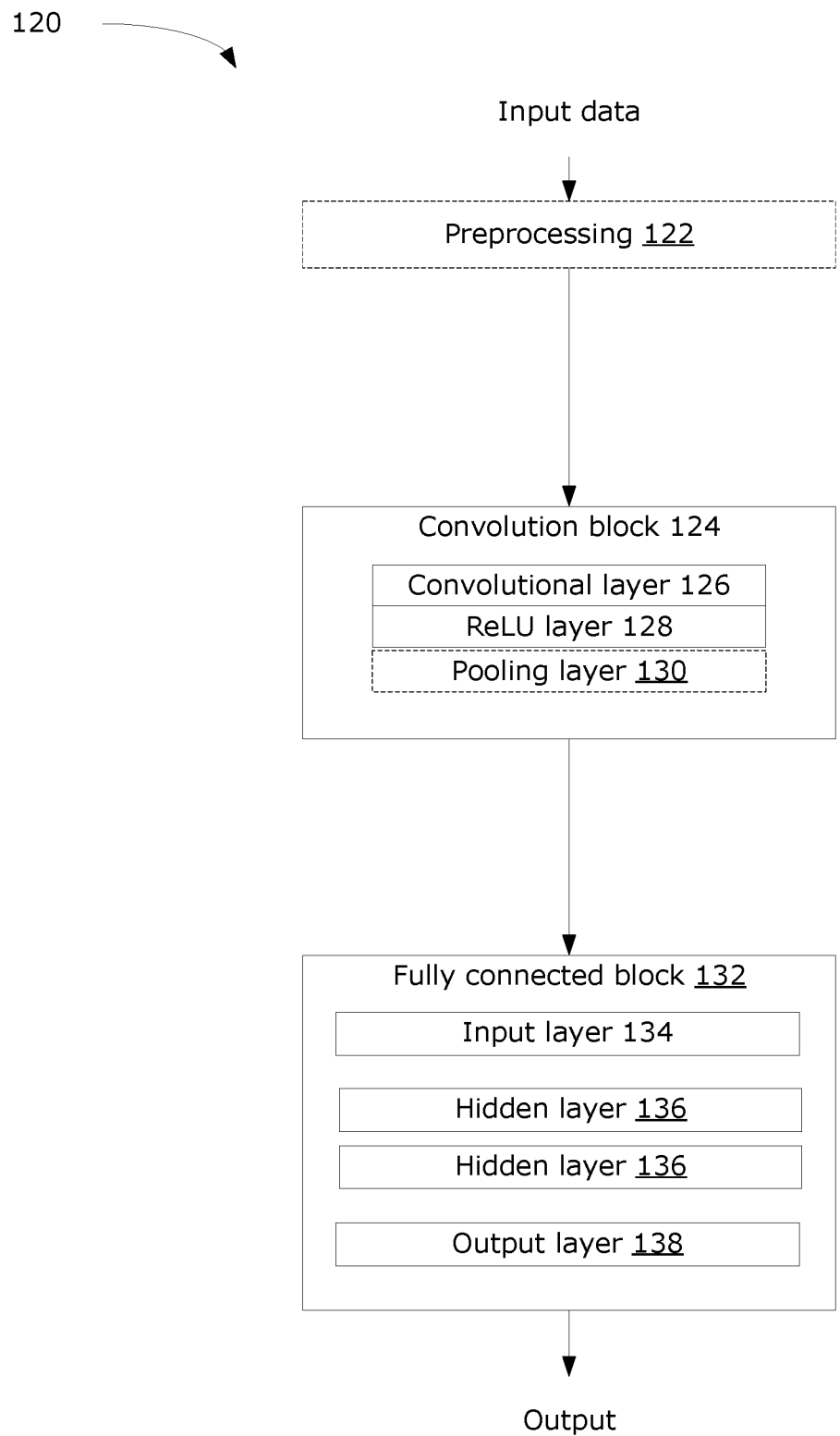
FIG. 1B is a schematic diagram of an example architecture for a deep neural network (DNN).

FIG. 1B illustrates an example architecture of a deep neural network (DNN) 120. The DNN 120 in this example is constructed and arranged for performing a specific task during training and inference, such as object detection, object recognition and classification (i.e. object localization and classification), audio recognition and classification, text recognition and classification, and the like. The DNN 120 has been simplified, is not intended to be limiting and is provided for the purpose of illustration only. The input data to the DNN 120 may be, for example, image data representing a digital image, audio data representing an audio file, or text data (i.e. an embedding representing a word or a sentence). A single sample of input data (e.g., a single image) may be referred to herein as an "input sample". Optional elements are shown in dashed lines.

The DNN 120 in this example is a convolutional neural network (CNN). It includes one or more convolution blocks 124 configured to perform feature learning, and a fully connected block 132 configured to perform a particular task. The DNN 120 may also optionally include a preprocessing block 122, which may perform various operations, such as normalization, to prepare the input data for a convolutional block 124.

The convolution block 124 shown in FIG. 1B may include, for example, include a convolutional layer 126, a combined non-linearity and rectification layer (e.g. ReLU layer 128) and an optional pooling layer 130. The output from each layer in the convolution block 124 is used as input to the next layer in the convolution block 124. In other words, an output from a convolutional layer 126 may be used as an input to a following ReLU layer 128, and the output of the ReLU layer 128 may be used as an input to a pooling layer 130, or may be used as an input to a convolutional layer 126 of another convolutional block 124, to continue a convolution operation.

The internal operating principles of a convolutional layer 126 are described in detail below with reference to FIG. 1C. In summary, a convolutional layer 126 performs convolution operations on its input activations maps to generate an output that consists of output activation maps generated from the input activation maps.

Because a quantity of parameters (e.g. weights) of filters of a convolutional layer 126 usually needs to be reduced, a pooling layer 130 may follow a convolutional layer 126 in a convolutional block 124. In an image processing process, a purpose of the pooling layer 130 is to reduce a size of the output activation maps generated by ReLU layer 128. The pooling layer 130 may include an average pooling operator and/or a maximum pooling operator, to perform sampling on the input activation maps to obtain the output activation maps of a relatively small size. The average pooling operator may compute a pixel value in the activation map within a specific range, to generate an average value as an average pooling result. The maximum pooling operator may obtain, as a maximum pooling result, a pixel with a largest value within the specific range. The size of the activation map output after processing by the pooling layer may be smaller than a size of the activation map input to the pooling layer. Each pixel in the activation map output by the pooling layer indicates an average value or a maximum value of a subarea corresponding to the activation map input to the pooling layer.

After the input data is processed by the convolution block 124, the DNN 120 is still incapable of outputting desired output information. To generate final output information (e.g., object category (i.e. class), bounding box, etc.), a fully connected block 132 of the CNN 120 generates an output from the output of the convolution block 124. The output of the convolution block 124 is output activation maps as described above.

Figure 2:
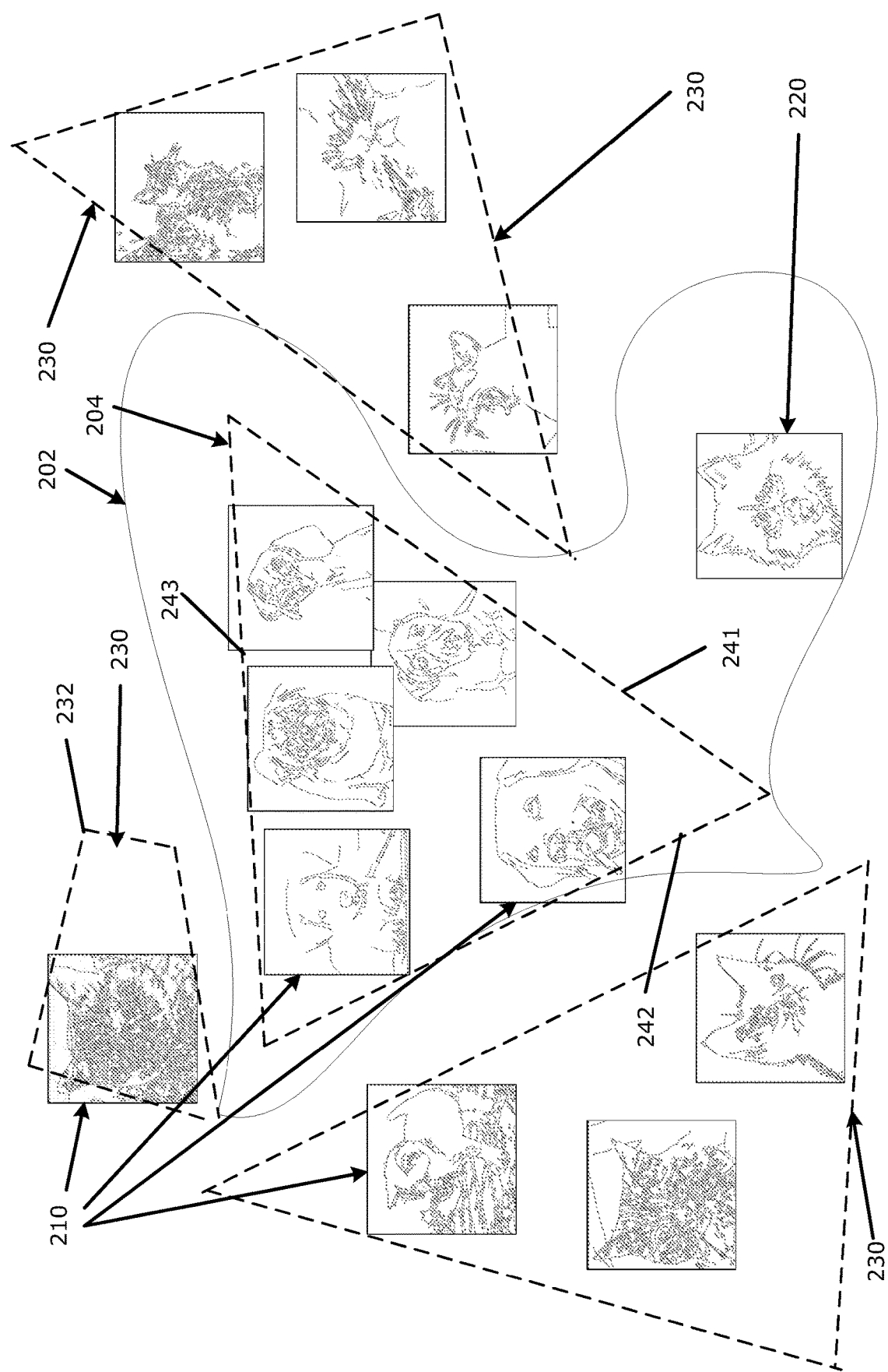
FIG. 2 is a schematic diagram of a simplified representation of rules extracted from a deep neural network, in accordance with the present disclosure.

The fully connected block 132 includes an input layer 134, one or more hidden layers 136, and an output layer 138. The output layer 138 follows the last hidden layer 136 of the fully connected block 132. In other words, the output layer 138 is a final layer in the entire DNN 120. During training of the DNN 120, training data and a supervised learning algorithm are used to train the DNN 120. After forward propagation (propagation in a direction from 124 to 138 in FIG. 2 is forward propagation) is complete a loss function similar to category (i.e. class) cross-entropy is used to compute a prediction error of the DNN 120, and back propagation (propagation in a direction from 138 to 124 in FIG. 2 is back propagation) is performed to update the parameters (e.g. weights) of the layers 128, 130, 132, 134, 136, and 128 of the DNN 120 and the weights of the filters based on the computed prediction error to reduce the prediction error between an ideal result (i.e. the ground truth in the training data) and the prediction result output by the output layer 138.

In a DNN 120 trained to perform a classification task, the last hidden layer 136 of the fully connected block 132 may be a logits layer immediately prior to the output layer 138. The logits layer generates a set of logits that correspond to a probability distribution for the classification task, indicating an inferred (i.e. predicted) probability for each of a plurality of possible categories into which the input sample may be classified. The output layer 138 may apply a Softmax function to the logits generated by the logits layer to normalize the logits into a probability distribution from 0 to 1. The Softmax function thereby generates an output of the DNN 120 consisting of two or more categories, each category having an associated classification probability associated with the corresponding input sample. Thus, in response to an input sample consisting of a photograph of a dog, a DNN 120 trained to classify images into the categories "dog" and "cat" may generate an output at its output layer 138 consisting of the classification probabilities ("dog",0.993|"cat",0.007).

It should be noted that the DNN 120 shown in FIG. 1B is merely used as an example architecture of a deep neural network. In actual application, the architecture of the DNN 120 may exist in a different form.

The above discussion provides an example that illustrates how a trained DNN may be used for performing a specific task during inference. In general the input data may have one, two or three (or more) dimensions, and the output may have any suitable format, depending on the task. The example embodiments herein shall be described in the context of a DNN that is used to perform a particular task, such as a classification task, including classification of objects in images or natural language processing (NLP). In the example embodiments described herein, the input to the DNN 120 is an image that may be pre-processed by and fed to the input layer, receiving input activation maps and generating output activation maps in the form of multi-channel 2D pixel arrays (i.e., 3D arrays defined by a pixel height, a pixel width, and a channel depth). However, it will be appreciated that data arrays of different dimensionality may be used as input or output in some embodiments, such as multi-channel 1D arrays for tasks involving e.g. audio or text inputs.

Example Convolution Layer and Activation Maps

Figure 1C:
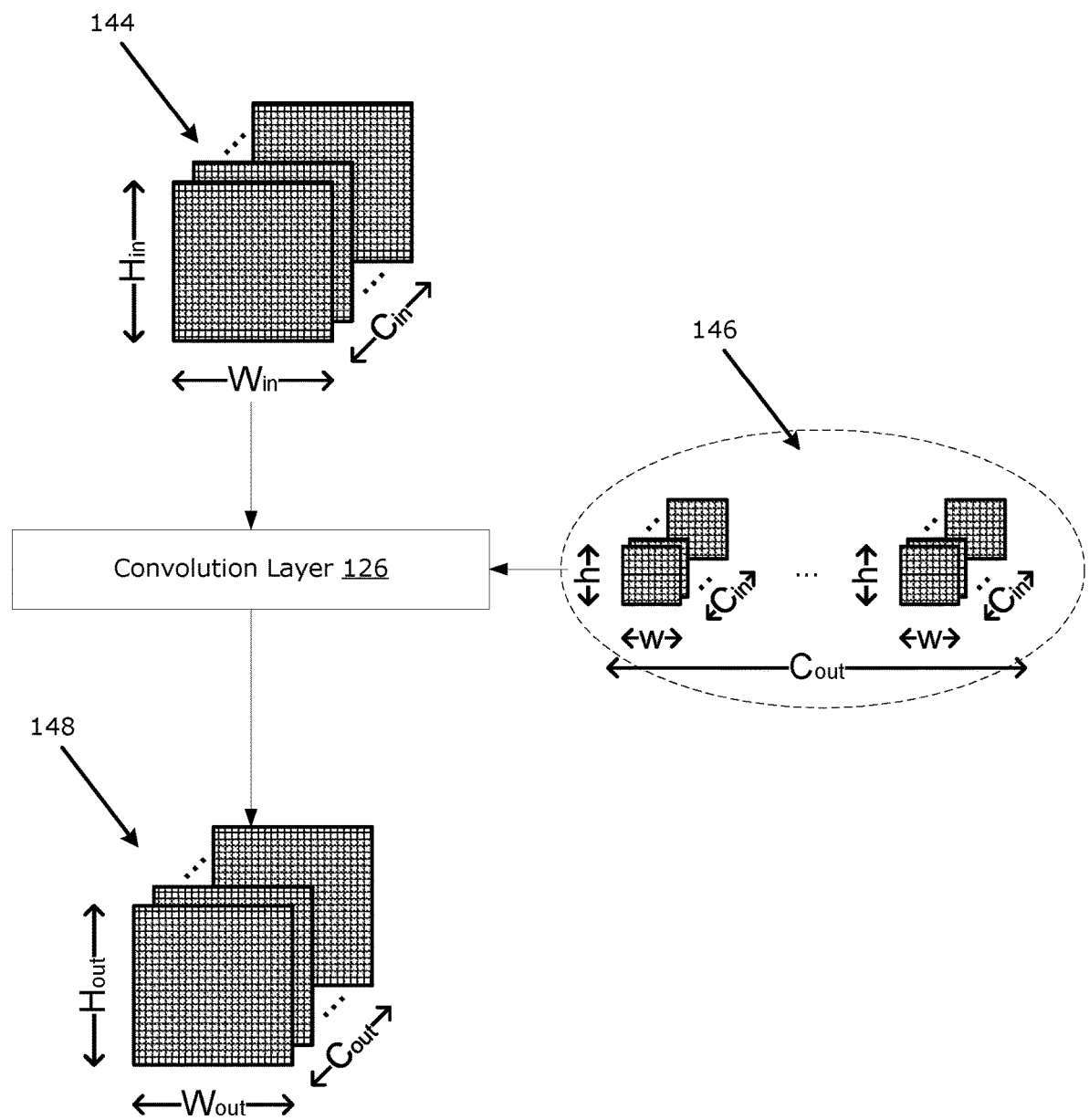
FIG. 1C is a schematic diagram of a convolution layer of the DNN of FIG. 1B showing the dimensions of an input data array, an output data array, and a set of convolution filters applied by the convolution layer.

FIG. 1C illustrates a convolutional layer 126, showing the dimensions of an input data array 144, an output data array 148, and a set of convolution filters 146 applied by the convolution layer 126. The input data array 142 is shown here as a multi-channel set of activation maps having a number of input channels (i.e. activation maps) equal to value Cm. Each channel of the input data array 144 consists of a 2D array, such as an image consisting of a 2D pixel array, having a height $H_{in}$ and a width $W_{in}$. Thus, the number of values stored in the input data array 142 is equal to $(H_{in} \times W_{in} \times C_{in})$. The convolution filters 146 applied to the input data array 144 each have a height h, a width w, and a channel depth $C_{in}$. The convolution layer 126 uses a number of convolution filters 146 equal to value $C_{out}$.

The convolutional layer 126 applies the convolution filters 146 to the input data array 144 in a series of convolution operations. Each convolution filter 146 is applied to the input data array 144 to generate a channel of the output data array 148, shown here as a multi-channel set of activation maps having a number of output channels (i.e. output activation maps) equal to value $C_{out}$. Each channel of the output data array 148 consists of a 2D array, such as an image consisting of a 2D pixel array, having a height $H_{out}$ and a width $W_{out}$. The relationships between $H_{in}$ and $H_{out}$, and between $W_{in}$ and $W_{out}$, are determined by the kernel dimensions h and w and the stride, padding, and other convolution configuration values or hyperparameters used by the convolution operations of the convolution layer 126. In some embodiments, $H_{in}=H_{out}$, and $W_{in}=W_{out}$. For example, an example embodiment may use kernel dimensions h=3 and w=3, with padding of 1 pixel and stride 1, to generate an output data array wherein $H_{in}=H_{out}$, and w=$W_{out}$. The use of a convolution layer 126 wherein $H_{in}=H_{out}$, and $W_{in}=W_{out}$ may present certain advantages, for example in embodiments using hardware or software components optimized to process input channels having fixed dimensions.

Example embodiments providing DNN representation and interpretation will now be described with reference to FIGS. 2-8.

Example Representation of DNN Decision Boundaries

FIG. 2 shows a schematic diagram of a simplified representation of rules extracted from a deep neural network (DNN). In this example, the DNN has been trained and receives input samples 210 in the form of images. Each input sample 210 shown in FIG. 2 is an image of a dog or an image of a cat. The DNN in this example has been trained to classify input samples in a first category, "dog", or a second category, "cat" (or, in some examples, "not dog"). Thus, the trained DNN, in response to receiving a given input sample, will generate as output a label (namely, the label "dog" or the label "cat"). The mapping between input samples and output labels may be referred to herein as the "classification behavior" of the trained DNN. Any function, algorithm or process that replicates the trained DNN's mapping between its input space and its output space may be said to replicate the classification behavior of the trained DNN. Similarly, to the extent that a function, algorithm or process results in a mapping between inputs and outputs that approximates but does not fully replicate the mapping of the trained DNN (i.e., most or many input samples are mapped to the same output label that the DNN would generate), it may be said to approximate the classification behavior of the trained DNN. As used herein, the term "behavior" as applied to the DNN or another machine learning model is used to refer to the classification behavior thereof.

FIG. 2 is shown as a two-dimensional space for the sake of clarity and visibility, but the actual data space defined by the input samples 210 is multi-dimensional. The number of actual dimensions of the data space defined by the input samples may be equal, in some embodiments, to the number of pixels multiplied by the number of channels of each input sample.

The classification behavior of the trained DNN in this example results in classification of input samples as "dog" or "cat" as shown by the DNN decision boundary 202: when provided with an input sample 210, the DNN will output a predicted label for the first category "dog" if the input sample falls inside DNN decision boundary 202, or the trained DNN will output a predicted label for the second category "cat" if the input sample falls outside DNN decision boundary 202. Example embodiments described herein may generate a simplified representation of the DNN decision boundary 202, such as single rule 204, which is shown as a triangle defined by three decision boundaries 241, 242, 243 shown as straight lines, but the single rule 204 may in fact be a convex polytope in the multi-dimensional data space, wherein each decision boundary 241, 242, 243 is a hyperplane through the data space. Single-rule generation is described below with reference to FIGS. 6A-B and 7A-D.

It will be appreciated that the single rule 204 may not precisely duplicate every classification decision made by the DNN. For example, input sample 220 showing a photograph of a dog falls outside of the single rule 204 but inside the DNN decision boundary 202. In some embodiments, the single rule 204 is generated such that the single rule matches the classification behavior of the DNN as closely as possible while using a small number of decision boundaries 241, 242, 243. In some embodiments, the behavior of the DNN may be more closely matched by generating one or more additional rules in addition to the single rule 204. In FIG. 2, several additional rules 230 are shown, wherein input samples falling within each additional rule 230 is classified in the second category "cat". Additional rules are also generated by the methods described below with reference to FIGS. 6A-B and 7A-D. Although the additional rules 230 in FIG. 2 all encompass input samples of the second category "cat", additional rules generated by the methods described herein may be defined to encompass input samples of the first category, second category, or any other category or set of categories.

It will be appreciated that the number of decision boundaries defining the single rule 204 or any additional rule 230 need not be limited to three. Some embodiments may use a larger number of hyperplanes to define the convex polytope of the rule, and in some embodiments the different rules generated by a multi-rule extraction method may each have a different number of decision boundaries. For example, additional rule 232 shown in FIG. 2 has four decision boundaries instead of three.

After one or more rules have been extracted from a DNN according to the methods described below with reference to FIGS. 6A-B and 7A-D (a process which may be called "DNN Representation"), the rule or rules may be used as a simplified model or classifier that approximates the inferential behavior of the DNN. In addition, or in the alternative, the rule or rules may be used to generate a human-understandable representation of one or more decision boundaries of one or more of the rules (a process which may be called "DNN Interpretation"). Example DNN interpretations will now be described with reference to FIGS. 3-4.

Example Interpretation of DNN Decision Boundaries

Figure 3:
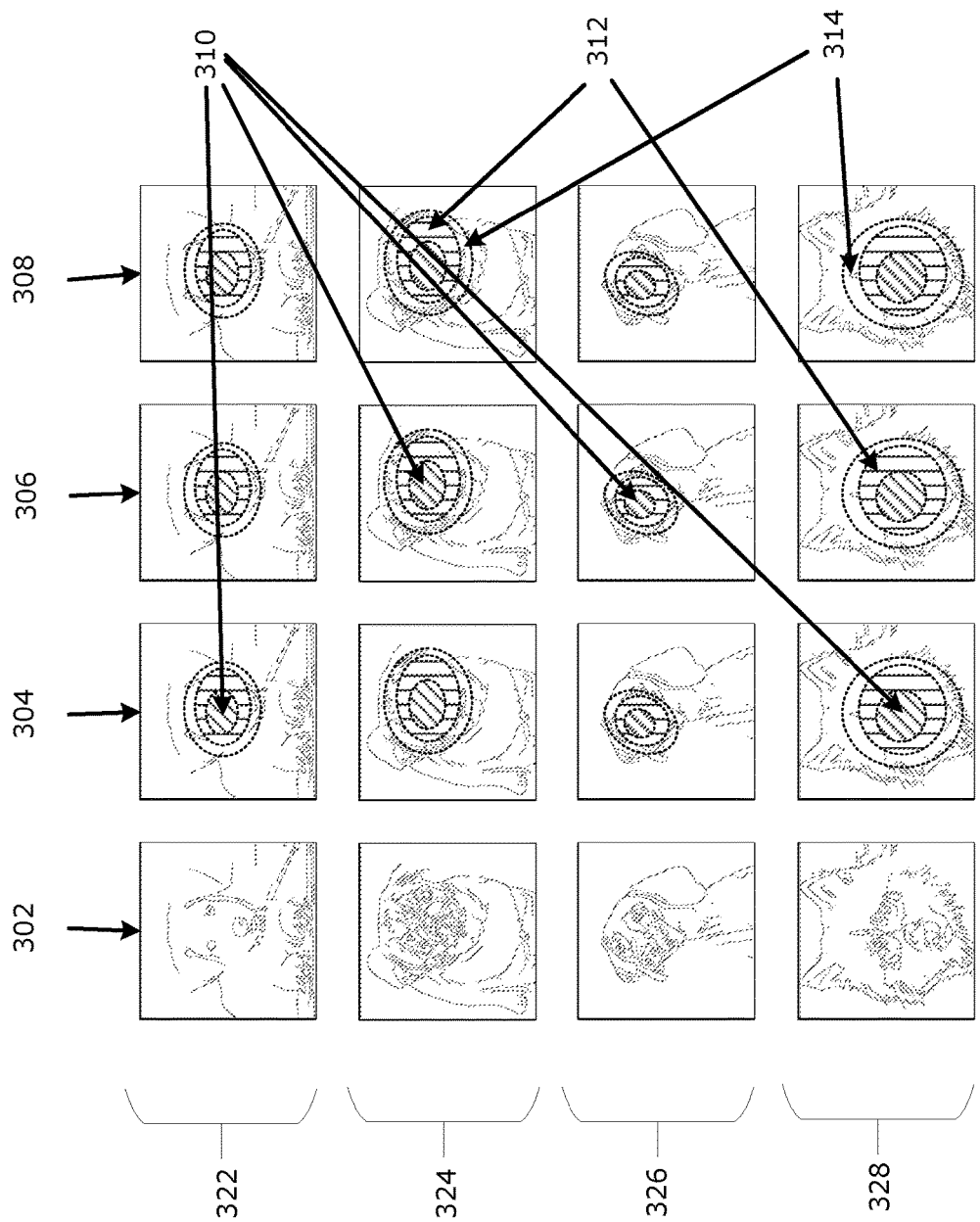
FIG. 3 is a set of human-understandable representations of three decision boundaries of a rule extracted from a deep neural network trained to classify images as showing cats or dogs, applied to four separate interpretation samples, in accordance with the present disclosure.

FIG. 3 shows human-understandable representations of three decision boundaries of a rule extracted from a deep neural network trained to classify images as showing cats or dogs. Each of the four rows 322, 324, 326, 328 of FIG. 3 shows an input sample (on the left) followed by a human-understandable representation of each of the three decision boundaries of a rule applied to the input sample. The input sample in each row 322, 324, 326, 328 is referred to herein as an "interpretation sample", meaning an input sample provided as input to the DNN in order to generate one or more human-understandable interpretations of the rule extracted from the DNN. With reference to the first row 322, a first interpretation sample 302 is shown as a photograph of a dog. The methods described below in reference to FIGS. 6-7D are used to generate at least one rule, such as single rule 204 of FIG. 2. The first interpretation sample 302 is then used to generate one or more human-understandable representations (shown here as three human-understandable representations 304, 306, 308) of the decision boundaries of the rule extracted from a DNN. Each human-understandable representation 304, 306, 308 corresponds to one of the three decision boundaries of the rule (e.g., the first human-understandable representation 304 may correspond to decision boundary 241 of the single rule 204 as visualized using the first interpretation sample 302). Each of the other rows 324, 326, 328 also shows an interpretation sample (a photograph of a dog in each case) on the left followed by three human-understandable representations of the decisions boundaries of the same rule used by the first row 322, as visualized using the representation sample of the respective row. The 4 by 4 matrix of images shown in FIG. 3 may be referred to as a heatmap matrix, further described below with reference to FIG. 8.

In this example, in each row 322, 324, 326, 328, each human-understandable representation (e.g., 304, 306, or 308) of the decision boundaries of the rule extracted from the DNN is generated by combining the respective interpretation sample (e.g., 302) with a heatmap generated by the DNN interpretation method of FIG. 8 below. The heatmap is combined with its respective interpretation sample (e.g., 302) to yield a human-understandable representation showing the original interpretation sample 302 modulated, perturbed, overlaid, superimposed, or otherwise combined with its respective heatmap. For example, the heatmap may re-color the interpretation sample 302 such that pixel regions having a high heat level as defined by the heatmap are red-shifted whereas pixel regions having a low heat level as defined by the heatmap are blue-shifted or left unmodified. In some embodiments, the heatmap may recolor or color-shift multiple pixel regions using multiple colors in a spectrum, such as a first color (e.g., red) for very-high-heat regions, a second color (e.g., orange) for high-heat regions, and a third color (e.g., yellow) for moderate-heat regions, leaving low-heat regions unmodified. Continuous color values may be used in some embodiments to represent continuous heatmap values.

The generation of the heatmap is described in detail below with reference to FIG. 8. In summary, the heatmap indicates pixel regions of an input sample (i.e. interpretation sample 302) that are highly relevant or salient to a given decision boundary of the rule extracted from the DNN. This may mean that, in some examples, changing the pixel values of the pixels of an input sample (e.g. first interpretation sample 302) in highly-relevant regions of the input sample (e.g. first interpretation sample 302) would be likely to cause the DNN to classify the changed input sample (e.g. the changed first interpretation sample 302) on the other side of the decision boundary, relative to changes made to low-relevance pixel regions of the input sample (e.g. first interpretation sample 302).

In FIG. 3, in each row 322, 324, 326, 328, each human-understandable representation (e.g. 304, 306, or 308) of the decision boundaries of a rule extracted from a DNN is shown as the interpretation sample of the respective row (e.g. 302) with a superimposed heatmap corresponding to a respective decision boundary (e.g., decision boundary 241 for human-understandable representations 304, 242 for human-understandable representation 306, and 243 for human-understandable representation 308). This correspondence of decision boundaries to human-understandable representations is repeated for each other row 324, 326, 328 of FIG. 3, from left to right. Whereas the three human-understandable representations 304, 306, 308 are shown having similarly-shaped heatmaps to their counterparts in other rows 324, 326, 328, this may not be the case for some DNNs and/or some sets of interpretation samples.

The heatmap of each human-understandable representation includes a very-highly-relevant pixel region 310 that may be recolored according to a first color, a highly-relevant pixel region 312 that may be recolored according to a second color, and a moderately-relevant pixel region 314 that may be recolored according to a third color. The remainder of the image may be considered a low-relevance region that is not recolored. It will be appreciated that different embodiments may modify the images in different ways to visually represent heatmap values of each pixel or each pixel region.

By presenting one or more human-understandable representations (e.g., 304, 306, and 308) to a human user in association with one or more input samples (e.g., interpretation sample 302), various embodiments may allow users to interpret the behavior of the DNN to confirm that the DNN has satisfied one or more of the criteria described above (e.g., faithfulness, robustness, and comprehensiveness).

Alternative embodiments of DNN interpretation will now be described in the context of medical imaging with reference to FIG. 4.

Figure 4:
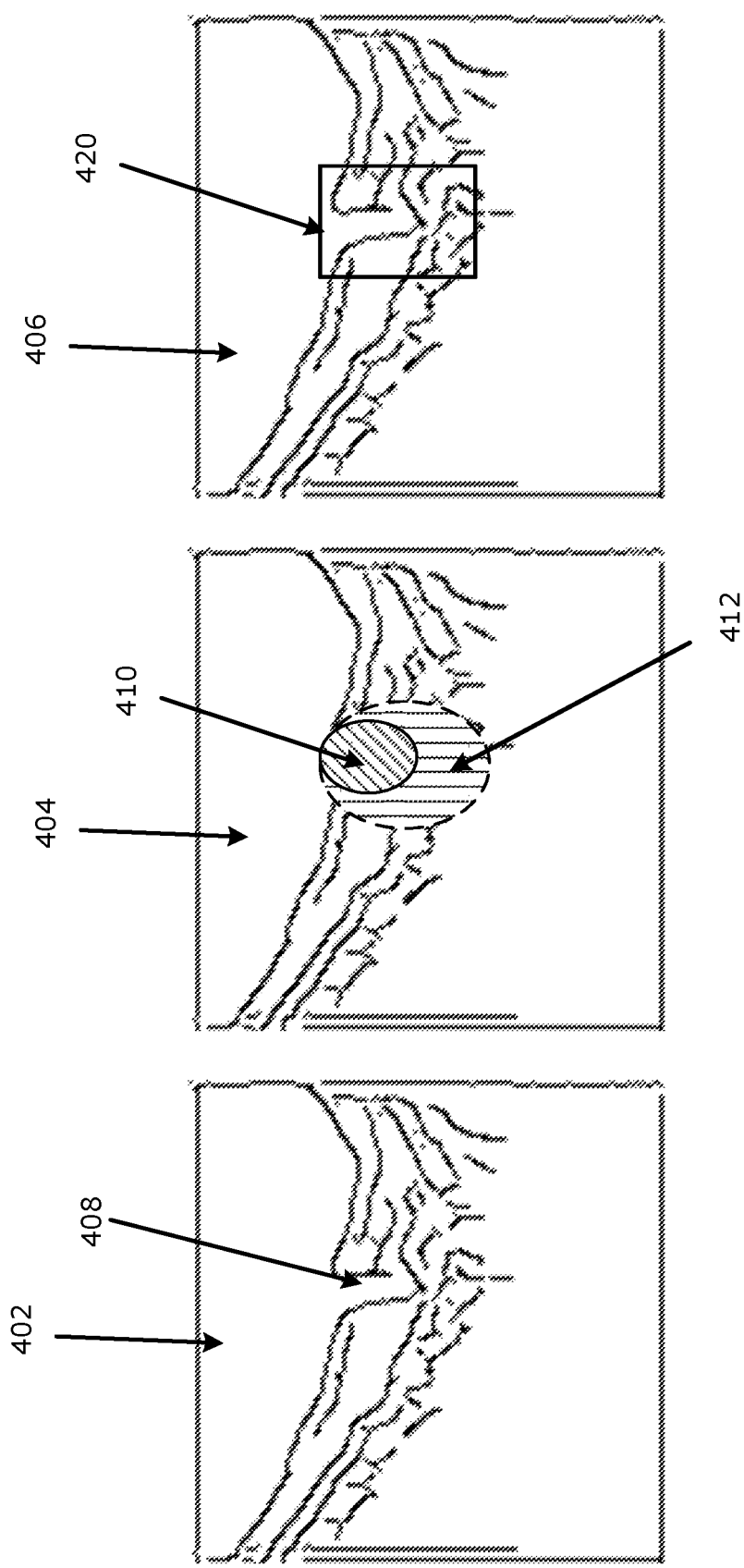
FIG. 4 is a further simplified representation of human-understandable representations of three decision boundaries of a rule extracted from a deep neural network trained to classify images as showing healthy or diseased retinas, in accordance with the present disclosure.

FIG. 4 shows two different types of human-understandable representations of a decision boundary of a rule extracted from a deep neural network trained to classify images as showing healthy or diseased retinas. On the left, an interpretation sample 402 shows an image (e.g., a CAT scan, X-ray, or MRI image) of a portion of a human retina. The interpretation sample 402 includes a region of interest 408 showing a potential marker for retinal damage or disease.

A DNN trained to classify retinal images as showing healthy or diseased retinas is provided with the interpretation sample 402, in accordance with the techniques described below with reference to FIG. 8. A first human-understandable representation 404 is generated in accordance with method 800 described below with reference to FIG. 8, showing the image of the interpretation sample 402 combined with a heatmap such as those described above with reference to FIG. 3. The heatmap identifies a high-relevance pixel region 410 and a moderate-relevance pixel region 412 of the image, using the visual representation techniques described above. The high-relevance pixel region 410 and moderate-relevance pixel region 412 may jointly correspond to the region of interest 408.

In an alternative embodiment, a second human-understandable representation 406 may be generated showing a bounding box 420 around the pixels of the region of interest 408. In some embodiments, the second human-understandable representation 406 is generated in accordance with method 800 described below with reference to FIG. 8, after which the bounding box 420 may be generated by identifying pixel positions of the heatmap above a heat threshold, and overlaying a bounding box 420 on the image that bounds the pixel positions that are above the heat threshold. It will be appreciated that other techniques and other visual representations of regions of interest may also be used in association with the DNN interpretation methods described herein.

Figure 5:
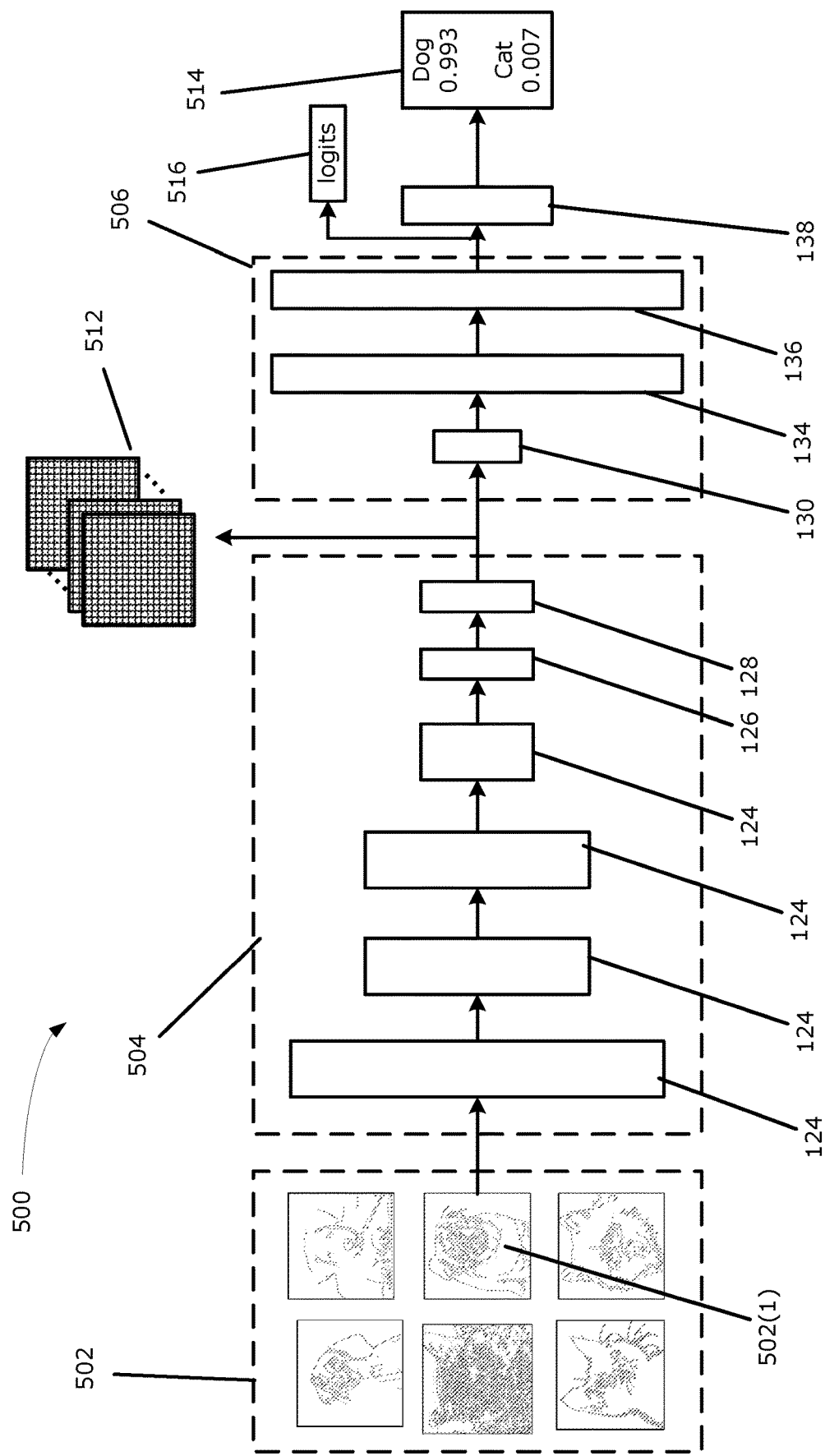
FIG. 5 is a block diagram of an example deep neural network including a truncated portion for generating updated input samples and a tail portion for generating inferences based on the updated input samples, in accordance with the present disclosure.

An example DNN will now be described with reference to FIG. 5, showing how the output of a truncated portion of the DNN may be used by the various DNN representation and interpretation methods described herein.

Example Truncated DNN for Representation and Interpretation

FIG. 5 is a block diagram of an example deep neural network 500, including a truncated portion 504 for generating updated input samples 512 based on input samples 502, and a tail portion 506 for generating classification data 514 based on the updated input samples 512.

In this example, the DNN 500 is trained to perform an image classification, such as classifying each input sample of a set of input samples 502 into a first category "dog" or a second category "cat". The DNN 500 is used to perform the image classification on a plurality of the input samples 502, thereby generating, for each input sample, an updated input sample 512 and a classification of the input sample. The classification comprises classification data 514 generated by an output layer 138 of the tail portion 506. The updated input sample 512 comprises one or more output activation maps generated by the truncated portion 504 of the DNN 500 based on the input sample.

In this example, the DNN 500 is shown as a convolutional neural network (CNN) having a number of convolution layers 126 organized within convolution blocks 124, as described above with reference to FIG. 1B. The truncated portion 504 (also referred to herein as $F_{trunc}$) is shown to include several convolution blocks 124 and a partial convolution block at its right end consisting of a convolution layer 126 and a ReLU layer 128. The updated input samples 512 are therefore the output of the ReLU layer 128 in this example.

The tail portion 506 (also referred to herein as $F_{tail}$) is shown to include a pooling layer 130 of the partial convolution block 124 at the left end of the truncated portion 504, followed by a fully connected block consisting of an input layer 134 and a hidden layer 136. An output layer 138 of the DNN 500 is not considered part of the tail portion 506 of the DNN 500 for the purpose of the presently described embodiments. In this example, the input layer 134 and hidden layer 136 may be fully-connected layers, and the hidden layer may function as a logits layer generating a set of logits 516 as its output. The logits 516 are received as input by the output layer 138, which may apply a Softmax function to normalize the logits 516 and thereby generate the classification data 514. For the purpose of the presently described embodiments, the logits 516 may be considered the output of the DNN 500. It will be appreciated that the term "hidden layer" is used to maintain consistency with the example neural network of FIG. 1B; however, in the example DNN 500, all layers other than the first convolutional layer 124 at the left end of the truncated portion 504 and the final hidden layer 136 may be considered to be "hidden" layers, as they are not a final input or final output layer 138.

When provided with specific input sample 502(1), consisting of a photograph of a dog, the DNN 500 may generate classification data 514, consisting of a probability that the specific input sample 502(1) is classified in a first category or a probability that the specific input sample 502(1) is classified into a second category, shown as classification probabilities ("dog",0.993|"cat",0.007).

The updated input samples 512 generated by the truncated portion 504 are shown as a set of activation maps that are the output (i.e. output activation maps) of the ReLU layer 128. In some embodiments, the updated input samples 512 are generated by a different layer of the DNN 500. The updated input samples 512 may be used to simplify the computation of representations and interpretations of the DNN 500, as described below with reference to FIGS. 6-8. However, in some embodiments, the input samples 502 themselves may be used as the updated input samples 512.

In some embodiments, the DNN 500 may have a structure that conforms to one of the DNN architectures described by Karen Simonyan and Andrew Zisserman in "Very Deep Convolutional Networks for Large-Scale Image Recognition", 2014, arXiv:1409.1556 [cs.CV], available at https://arxiv.org/abs/1409.1556. For example, the DNN 500 may have a structure that conforms to the DNN architectures of configuration "A" from the Simonyan reference: 11 weight layers, including an input layer that accepts as input a 224×224 RGB image; a convolution layer with 64 convolution kernels of dimension 3×3 (i.e. receptive field size of 3, 63 output channels); a maxpool (i.e. maximum pooling) layer; a convolution layer with 128 convolution kernels of dimension 3×3; another maxpool layer; two convolution layers, each with 256 convolution kernels of dimension 3×3; another maxpool layer; two convolution layers, each with five hundred and twelve (convolution kernels of dimension 3×3; another maxpool layer; another two convolution layers, each with 256 convolution kernels of dimension 3×3; another maxpool layer; a fully-connected layer of 4096 output channels; another fully-connected layer of 4096 output channels; a fully-connected layer of 1000 output channels; and a Softmax layer (although the Softmax layer may be omitted from the DNN 500 as described above, yielding a tail portion logits output 516 of 1000 output channels of the final fully-connected layer). It will be appreciated that each maxpool layer listed above follows, or is followed by, a ReLU layer. Further potential configurations are described in the Simonyan reference.

In some embodiments, the DNN 500 is not a CNN. It may be any neural network trained using machine learning and implemented by a computational structure or algorithm, as long as the neural network takes a numerical input (e.g., sets of pixel values of an image) and returns output scores (e.g., normalized probabilities) for each of a plurality of classes or categories.

Example methods of DNN representation will now be described with reference to FIGS. 6-7D, and example methods of DNN interpretation will be described with reference to FIG. 8.

Example Method for DNN Rule Extraction

Figure 6A:
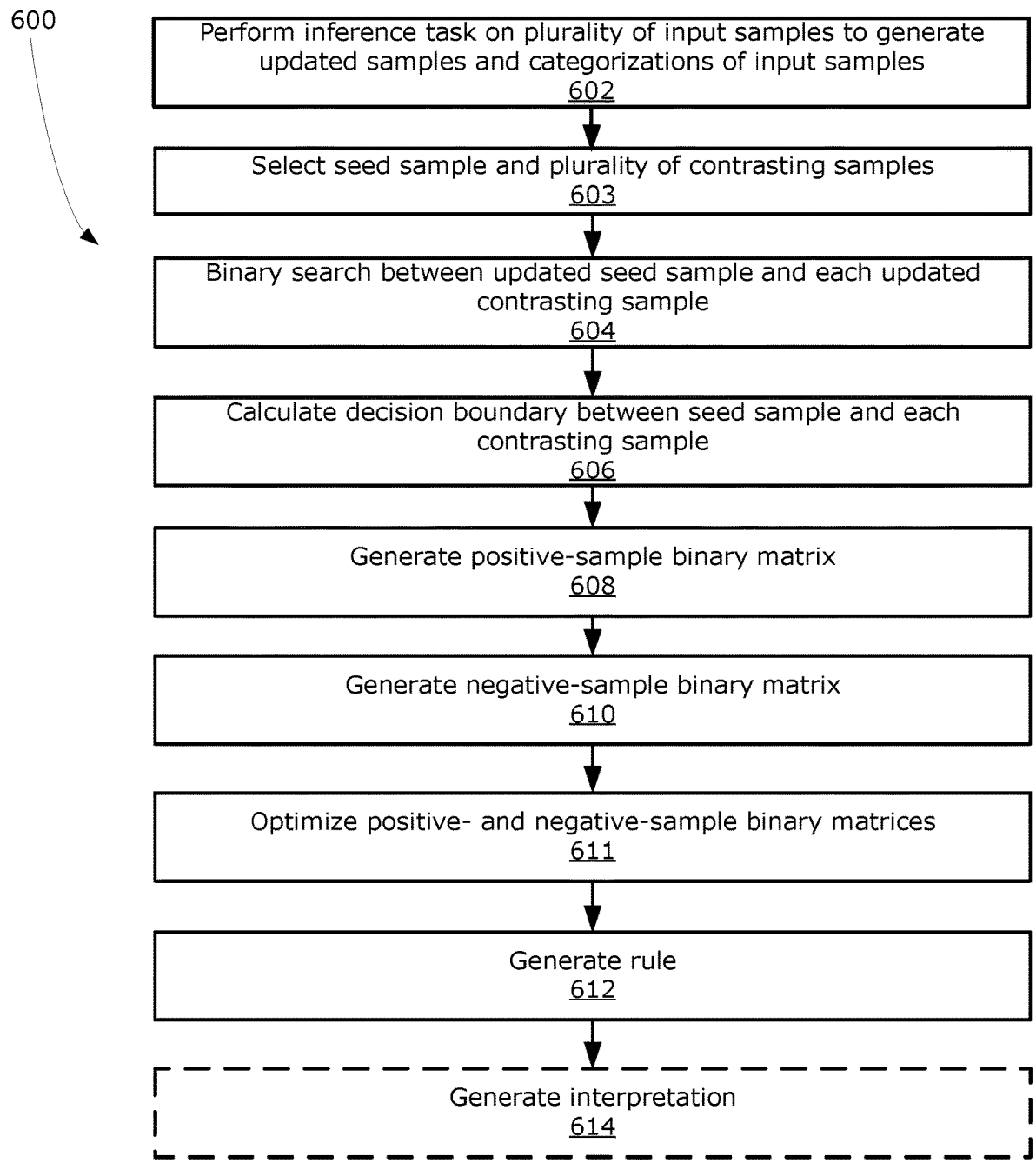
FIG. 6A is a flowchart of an example single-rule extraction method for generating a simplified representation of a deep neural network comprising a rule, in accordance with the present disclosure.

FIG. 6A is a flowchart of an example single-rule extraction method 600 for generating a simplified representation of a DNN comprising a rule. The method 600 may be referred to herein as "DNN Representation", "model representation", or "rule extraction". The steps of the method 600 will also be described with reference to FIGS. 7A-7D, which show visualizations of the various steps of the method 600.

Method 600 generates a rule approximating the classification behavior of a neural network trained to perform a classification task, such as DNN 500 trained to perform image classification. The rule comprises a convex polytope defined by a plurality of hyperplanes in a multi-dimensional Euclidean space defined by a plurality of updated input samples 512 used to generate the rule. The updated input samples 512 falling within the convex polytope are likely to be classified in a first category (e.g., "dog") by the neural network.

Method 600 is performed on a neural network trained to perform a classification task as described above. In this example, the method 600 will be described in the context of the DNN 500 of FIG. 5.

The steps of method 600 may be referred to herein by terms that denote their overall function. Steps 602 and 603 may be referred to collectively as "initialization" of the DNN 500, because they generate the set of updated samples to be used in generating the rule. Steps 604 and 606 may be referred to collectively as "candidate pool generation", because they generate a pool of decision boundary candidates that may or may not be included in the rule. Steps 608 and 610 may be referred to collectively as "binary matrix reformulation", because they reformulate the set of decision boundaries in the candidate pool as binary matrices. Step 611 may be referred to as submodular optimization, because it selects an optimal subset of the columns of the binary matrices to generate a smaller set of hyperplanes used to define the rule. Steps 602 through 612 may be referred to collectively as "single rule extraction", because they generate a single rule that may be used as a representation of the DNN 500. Step 614 may be referred to as "interpretation", because it generates a human-understandable representation of the classification behavior of the DNN 500 based on the single rule generated through single rule extraction.

At 602, the DNN 500 is used to perform image classification on a plurality of input samples 502, thereby generating, for each input sample (e.g. first input sample 502(1)), an updated input sample 512 and a classification probability for a first category and a classification probability for a second category, e.g., classification data 514. The updated input samples 512 each comprise one or more output activation maps generated by the truncated portion 504 based on the respective input sample 502.

In some embodiments, the DNN 500 may be trained using the same input samples used by method 600. Each updated input sample 512 may be relabeled based on its respective classification data 514 generated by the DNN 500: e.g., a first input sample 502(1) that is classified by the DNN 500 as most likely in the first category "dog" in the classification data 514 (which is shown as indicating 0.993 probability of being in category "dog" and 0.007 probability of being in category "cat") may have its respective updated input sample 512 labelled as first category "dog".

FIG. 7A shows a two-dimensional visualization of a data space showing input samples 502 that have been labeled with a label associated with a category output by the DNN 500. A first set of labeled input samples 706 include a label output by the DNN 500 associated with the first category (e.g., "dog"), and a second set of labeled input samples 704 include a label output by the DNN 500 associated with the second category (e.g., "cat"). As in FIG. 2, the data space is actually multi-dimensional, but is shown as two-dimensional for the purpose of simplicity and visibility.

At 603, a seed sample and a plurality of contrasting samples are selected from the labelled input samples 704, 706. The seed sample may be any input sample from first set 707 or second set 704. In this example, the DNN 500 is provided the seed sample and outputs a label associated with the first category (e.g., "dog") for the seed sample, i.e. the seed sample is an input sample selected from first set 706. The seed sample is used as a starting point for generating the rule. The updated input sample 512 generated by the truncated portion 504 of the DNN 500 based on the seed sample is called the updated seed sample.

Because the seed sample is in the first set 706, the plurality of contrasting samples may be any input samples selected from the second set 704, i.e., input samples for whom the second category (e.g., "cat") was output by the DNN 500. The method 600 selects a number of contrasting input samples equal to a predetermined candidate pool size. The predetermined candidate pool size effectively defines an upper bound on the number of decision boundaries included in the rule generated by the method 600. The updated input sample 512 generated by the truncated portion 504 of the DNN 500 based on each contrasting sample is called an updated contrasting sample.

In some examples, the set of updated contrasting samples is selected randomly from the updated samples of the training data, with the constraint that the updated contrasting sample must be categorized (i.e. relabeled) as being in the second category (i.e. different from the relabeled updated seed sample). Importantly, the label attached to the updated contrasting samples for the purpose of method 600 is not the pre-determined training label attached to the training data sample; rather, it is the label predicted by the DNN 500. Similarly, the label attached to the seed sample for the purpose of method 600 is the label predicted by the DNN 500.

FIG. 7B shows the two-dimensional visualization of FIG. 7A with the updated seed sample 708 and five updated contrasting samples 712, 714, 716, 718, and 719 identified. Thus, in this example, the predetermined candidate pool size is five.

At 604, a binary search algorithm (referred to herein as "binary search") is performed between the updated seed sample 708 and each updated contrasting sample 712, 714, 716, 718, 719. The binary search will be described with reference to the example of updated contrasting sample 712, taking place over range 732. It will be appreciated that a binary search algorithm can be used to locate a desired value located at an unknown point between two known starting values in an ordered sequence of items, such as an ordered list. A binary search algorithm begins by determining the value of an item at the midpoint between the two starting values. Based on the value determined at the midpoint item, the next step of the binary search algorithm selects a second item at the midpoint between the midpoint item and either the first or second starting value, and determines the value of the second item. Further steps repeat this process until an item having the desired value, or close to the desired value, is located. In this case, the desired value is a multi-dimensional value (e.g. a vector) representing a boundary between two categories in multi-dimensional space.

In some embodiments, the binary search is an adjusted binary search. A number of notations used in this and subsequent steps of method 600 will first be defined. x is the seed sample. F is the DNN 500. The output is the logits 516 of hidden layer 136. $F_{trunc}$ is the truncated portion 504. $F_{tail}$ is the tail portion 506, and may also denote the logits output 516 of the hidden layer 136 of the tail portion 506. $X=F_{trunc}(X)$ is the updated seed sample 508. K is the predetermined candidate pool size. $s_{max}$ is the maximum boundary size for the rule, i.e. the maximum number of decision boundaries to be included in the rule. $X_1, X_2, \ldots, X_K$ are the updated contrasting samples, e.g., updated contrasting samples 712, 714, 716, 718, and 719. s is a search point for the adjusted binary search. $H=\{H_1, H_2, \ldots, H_K\}$ is a set of hyperplanes in the candidate pool. R is a subset of H. S is the solution of the submodular optimization. r is a ratio parameter for the adjusted binary search. e, $e_1$, $e_2$ are some extremely small parameters having predetermined values. $\max_i(v)$ is the i-th largest value of a vector v.

Figure 6B:
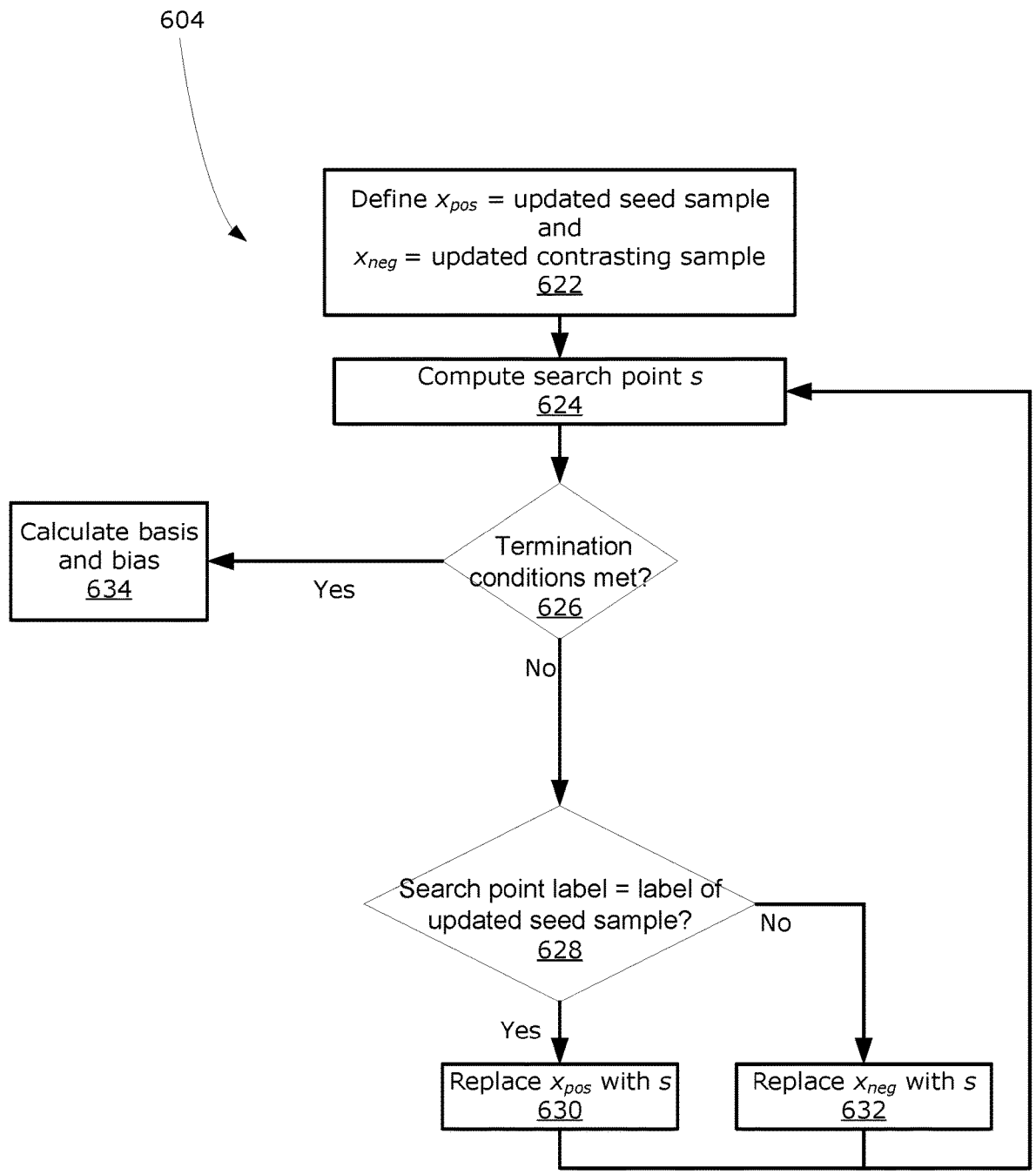
FIG. 6B is a flowchart of the adjusted binary search step of the method of FIG. 6A.

FIG. 6B is a flowchart of the adjusted binary search between the updated seed sample 708 and each updated contrasting sample 712, 714, 716, 718, 719 performed at step 604 of the method 600 of FIG. 6A.

At 622, the adjusted binary search begins by defining values $x_{pos}$=updated seed sample 708 and $x_{neg}$=updated contrasting sample 712.

At 624, search point $s=(1-r)x_{neg}+rx_{pos}$ is computed.

At 626, the adjusted binary search terminates if $\max_1(F_{tau}(s))-\max_2(F_{tail}(s))<e$ and $\text{argmax}(F_{tail}(X))=\text{argmax}(F_{tail}(s))$, wherein $F_{tail}(i)$ denotes the classification data 514 generated by the tail portion 506 based on updated sample i, and e denotes a predetermined search parameter having a relatively small value. The first condition means that s is very near to the decision boundary between the two categories (e.g., "dog" and "cat"). The second condition means that search point s and updated seed sample X are on the same side of the decision boundary.

If the terminating condition has not been met, at step 628 the adjusted binary search checks the classification of the search point s. If $\text{argmax}(F_{tail}(X))=\text{argmax}(F_{tail}(s))$, i.e. if the classification of the search point s is the same as the classification of the updated seed sample 708 (i.e. the first category "dog" in this example), the binary search proceeds to step 630, wherein the value of $x_{pos}$ is replaced with s. Otherwise, the adjusted binary search proceeds to step 632, wherein the value of $x_{neg}$ is replaced with s. The adjusted binary search then returns to step 624 to re-compute the search point $s=(1-r)x_{neg}+rx_{pos}$.

When the binary search terminates, at step 634 a basis and bias of the binary search are computed. The basis W is computed as $$W = \frac{\partial(\max_1(F_{tail}(\alpha))-\max_2(F_{tail}(\alpha)))}{\partial\alpha}\bigg|_{\alpha=s}$$

and the bias b is computed as $b=\max_1(F_{tail}(s))-\max_2(F_{tail}(s))-W^T s$.

Thus, the binary search is performed between the updated seed sample and the updated contrasting sample to generate a basis value and a bias value.

Returning to FIG. 6A, once the binary search between the update seed sample 708 and each updated contrasting sample 712, 714, 716, 718, 719 is completed at step 604, the method 600 proceeds to step 606. At 606, a decision boundary is computed between the updated seed sample 708 and each updated contrasting sample 712, 714, 716, 718, 719 based on the result of the binary search. Each decision boundary between input sample categories (e.g., between updated seed sample 708 in first category "dog" and updated contrasting sample 712 in second category "cat") is computed based on the value of the basis W and the value of the bias b computed by the binary search.

The decision boundary defines one of the plurality of hyperplanes in the candidate pool. The hyperplane $H_i$ may be defined by the equation $W^T v+b=0$ wherein v is an arbitrary vector, and the associated label of the hyperplane is the index of the second largest value of $F_{tail}(s)$. The "associated label" of a boundary refers to the label of the updated samples on the other side of the boundary.

The candidate pool, H, is the set of all $H_i$ for i=1, 2, ..., K.

FIG. 7B shows the decision boundaries generated based on the various binary searches, for example a first decision boundary 722 defined between the updated seed sample 708 and updated contrasting sample 712 based on the binary search over range 732, and a second decision boundary 724 between the updated seed sample 708 and updated contrasting sample 714 based on the binary search over range 734. The set of five decision boundaries (shown as dashed lines) defines the candidate pool H.

Returning again to FIG. 6A, method 600 proceeds to step 608. At 608, a positive-sample binary matrix is generated based on the candidate pool and the updated input samples 512. Each updated input sample 512 has already been relabeled with a label associated with the first category or second category. The set of updated input samples 512 that include a label associated with the first category may be referred to as updated positive samples, and the set of updated input samples 512 that include a label associated with the second category may be referred to as updated negative samples.

The positive-sample binary matrix A is generated as follows: each row represents an updated positive sample, and each column represents a hyperplane (i.e. a decision boundary) in the candidate pool. $A_{i,j}=1$ if the updated positive sample i and updated seed sample X 708 lie on the same side of hyperplane $H_j$, and $A_{i,j}=0$ otherwise. It will be appreciated that the updated seed sample 708 may be included in the set of updated positive samples, such that the row of A corresponding to the updated seed sample X 708 will be all one).

FIG. 7C shows positive-sample binary matrix A 740. Each column 746 corresponds to one of the hyperplanes in the candidate pool, such as first decision boundary 722. The first row 742 corresponds to updated seed sample X 708, and therefore has all bit values of 1. Each additional row 744 corresponds to another updated positive sample, i.e. one of the updated samples 706 shown as squares in FIG. 7A-7B.

Thus, the positive-sample binary matrix 740, denoted as A, comprises, for each updated positive sample 706, a row of binary values, each binary value indicating whether the updated positive sample 706 falls on a first side or second side of one of the hyperplanes (e.g., first hyperplane 722).

At 610, a negative-sample binary matrix is generated based on the candidate pool and the updated input samples 512, in a process very similar to generating the positive-sample binary matrix 740. The negative-sample binary matrix B is generated as follows: each row represents an updated negative sample, and each column represents a hyperplane (i.e. a decision boundary) in the candidate pool. $A_{i,j}=1$ if the updated negative sample i and updated seed sample X 708 lie on the same side of hyperplane $H_j$, and $A_{i,j}=0$ otherwise.

FIG. 7C shows negative-sample binary matrix B 750. Each column 746 corresponds to one of the hyperplanes in the candidate pool, such as first decision boundary 722. Each row 752 corresponds to an updated negative sample, i.e. one of the updated samples 704 shown as triangles in FIG. 7A-7B.

Thus, the negative-sample binary matrix 750, denoted as B, comprises, for each updated negative sample 704, a row of binary values, each binary value indicating whether the updated negative sample 704 falls on a first side or second side of one of the hyperplanes (e.g., first hyperplane 722).

At 611, an optimal subset of columns are selected from the positive-sample binary matrix 740 and the negative-sample binary matrix 750. Some embodiments may use submodular cost submodular cover optimization, as described below with reference to FIG. 6C, such that the number of hyperplanes in the plurality of hyperplanes defining the convex polytope of the rule is less than the predetermined candidate pool size.

FIG. 6C is a flowchart of an example method for selecting an optimal subset of columns from the binary matrices of FIG. 7C. It sets out sub-steps of step 611 of method 600.

At 642, for a subset of column R, $G_A(R)$ is defined as the number of rows of positive-sample binary matrix 740 that have a 0 within the columns of R. This means the number of updated positive samples outside of the convex polytope defined by the hyperplanes in R. $G_B(R)$ is defined similarly for negative-sample binary matrix 750.

At 644, a combinatorial optimization problem is formulated. In some embodiments, this may be an example of a Submodular Cost Submodular Cover (SCSC) optimization problem:

$$\min_{R} G_A(R) \text{ subject to } G_B(R) = G_B(H)$$

At 646, the SCSC optimization is solved using a greedy algorithm. The solution set S is initialized to be empty. A new column is then chosen repeatedly according to $$j = \operatorname*{argmin}_{t \in H \setminus S} \frac{G_A(S \cup \{t\}) + e_1}{G_B(S \cup \{t\}) + e_2}$$

and j is added to S. The algorithm terminates when $G_B(S) = G_B(H)$, meaning that all updated samples from other categories are excluded, or $|S| = s_{max}$, meaning that the algorithm has reached the maximum number of boundaries to be included in the rule. The purpose of $e_1$ and $e_2$ are to make sure that the numerator and denominators are not zero It will be appreciated that other known algorithms may be used for solving SCSC in other embodiments.

Optionally, at 648, the rule may be tightened by adding all columns in H\S that do not decrease the values of $G_A(S)$ and $G_B(S)$. This may reduce the volume of the polytope and make it more precise. This step 648 is recommended if the rule is to be used for model representation, i.e. for use as a simplified classifier, as described below.

Optionally, at 650, the rule may be tightened by removing all columns in S that does not increase the value of $G_A(S)$ and $G_B(S)$. This will remove any redundant boundary. This step 650 is recommended if the rule is to be used for generating a simplified interpretation of the model approximated by the DNN (also called "model interpretation", "DNN interpretation", or "DNN model interpretation"), as described below with reference to FIG. 8.

Alternatively, in some embodiments, different algorithms may be applied to remove redundant linear inequality constraints.

Returning to FIG. 6A, the method 600 proceeds to step 612 after an optimal subset of columns have been selected from the binary matrices 740, 750 at step 611. At 612, the rule is generated. The rule is defined to be the convex polytope that contains updated seed sample X 708 and bounded by the hyperplanes in set S. The associated label of the rule is the updated label of X 708. In some embodiments, the number of hyperplanes (up to $s_{max}$) in the plurality of hyperplanes S defining the convex polytope of the rule is less than the predetermined candidate pool size K.

FIG. 7D shows the rule defined by a subset of the plurality of decision boundaries of FIG. 7B. In this example, the rule is defined by the three decision boundaries 722, 726, and 728 included in S after binary matrix reformulation and submodular optimization. Each decision boundary 722, 726, 728 may have an associated label identifying the labels of the updated samples on the other side of the boundary, as described above. The rules as a whole may also have an associated label, denoting the category in which all updated samples covered by the rule are classified by the DNN 500.

Optionally, at step 614, the rule may be used to perform DNN model interpretation as described below with reference to FIG. 8.

In some embodiments, one or more additional rules may be extracted, such as additional rules 230 in FIG. 2. A multi-rule representation of the DNN 500 may be used as a simplified classifier approximating the classification behavior of the DNN 500. An example multi-rule extraction method will now be described with reference to FIG. 6D.

Example Multi-Rule Extraction Method

Figure 6D:
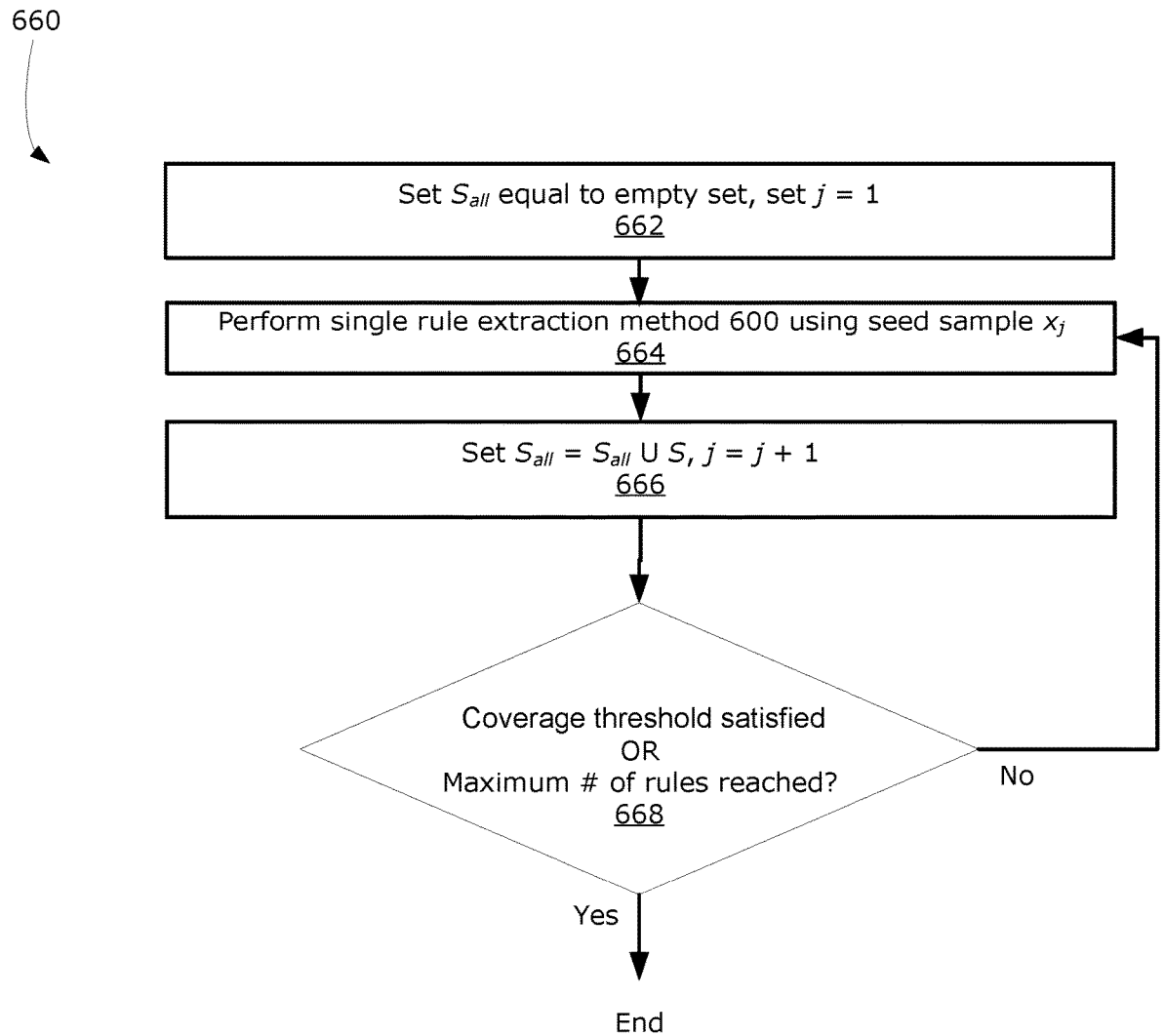
FIG. 6D is a flowchart of an example multi-rule extraction method generating multiple rules using the single-rule extraction method of FIG. 6A.

FIG. 6D is a flowchart of an example multi-rule extraction method 660 for generating a multi-rule representation of a DNN by iterating the method of FIG. 6A.

Notation and terminology used in describing method 660 will now be defined. n is the size of the set of all input samples. $D = \{x_1, x_2, \ldots, x_n\}$ is the set of all input samples (e.g., the union of set 704 and set 706). p is a required coverage ratio. S denotes an individual rule extracted by single-rule extraction method 600. $S_{all}$ is the set of all rules extracted at a given time in the execution of multi-rule extraction method 660. $\operatorname{cov}(S_{all})$ is the input sample coverage of $S_{all}$. T is the maximum number of rules to be included in the multi-rule representation. A "rule" is a convex polytope in the Euclidean space, with an associated label. An "applicable range" is the union of all regions enclosed by the rules in $S_{all}$. "Input sample coverage" means the number of input samples that are within the applicable range of at least one of the rules.

At 662, the multi-rule extraction method 660 is initialized. A set of decision boundaries (i.e. hyperplanes) $S_{all}$ is set equal to the empty set. An index value j is set equal to an initial value, e.g., 1.

At 664, single rule extraction method 600 is performed using a seed sample $x_j$ corresponding to index value j. This generates a single rule defined by a convex polytope with decision boundaries around the updated seed sample $X_j$.

At 666, the set of decision boundaries S defining the rule generated at step 664 is added to the set $S_{all}$ such that $S_{all} = S_{all} \cup S$. Index value j is incremented to value j+1.

At 668, a termination condition is checked. The multi-rule extraction method 660 terminates if either of two conditions is satisfied: first, if a predetermined input sample coverage threshold is satisfied (e.g., $\operatorname{cov}(S_{all}) > pn$), or second, if the number of rules extracted are equal to a maximum number of rules to be included in the multi-rule representation (e.g., $|S_{all}| \geq T$).

As noted above, input sample coverage refers to the number of updated input samples 512 contained in the applicable range of a set of one or more rules. A given input sample 502 may also be referred to as falling within the applicable range of a set of one or more rules if its respective updated input sample 512 falls within that applicable range. Thus, if a rule contains fifty updated input samples 512 inside its decision boundaries, it has an input sample coverage of fifty. If three rules have been generated that collectively include eighty updated input samples, the multi-rule representation defined by those three rules has an input sample coverage of eighty. The predetermined input sample coverage threshold may be a parameter governing the multi-rule extraction method 660 for generating a multi-rule representation of a DNN; in some embodiments, it may be set equal to a fixed percentage of the number of input samples.

A set of rules extracted using multi-rule extraction method 660 may be used for generating a multi-rule representation of a DNN. The set of rules $S_{all}$ may be employed as a simplified classifier approximating the classification behavior of the DNN 500: updated input samples 512 within the applicable range of the multi-rule representation of a DNN may be associated with a predicted label, or with a set of probabilities associated with one or more categories, by voting among the rules that cover the updated input sample 512. It will be appreciated that new input samples 502 to be classified by the multi-rule representation first need to be updated to generate updated input samples 512 using the truncated portion 504 of the DNN 500.

It will be appreciated that, depending on the label generated by the DNN 500 for each new seed sample $x_j$, the various rules in $S_{all}$ may encompass updated input samples 512 of different categories, such as the first rule 204 (encompasses first category "dog") and additional rules 230 (each encompass second category "cat") shown in FIG. 2.

Embodiments using a CNN for the DNN 500 may exhibit a further advantage when performing the multi-rule extraction method 660 for generating a multi-rule representation of the CNN: the decision boundaries of CNNs are piecewise-linear. Thus, when computing candidate hyperplanes (e.g., 241) for the candidate pool, the hyperplanes actually overlap with the actual decision boundary 202 sometimes. This property of CNNs is not a necessary property for generating simplified multi-rule representations of a DNN 500 as described above, but it may lead to simpler and/or more precise multi-rule representation of the CNN. With non-CNN DNNs, each candidate hyperplane is typically a linear approximation of the (typically non-linear) decision boundary. This piecewise linear property of CNNs is not inherent to CNNs; rather, it is a consequence of the ReLU function used by the ReLU layer 128 of a CNN, such as ReLU layer 128 at the right end of the truncated portion 504 of DNN 500. Any DNN that uses a piecewise linear activation function may be represented or interpreted using the techniques described herein.

Example Method for DNN Interpretation

Figure 8:
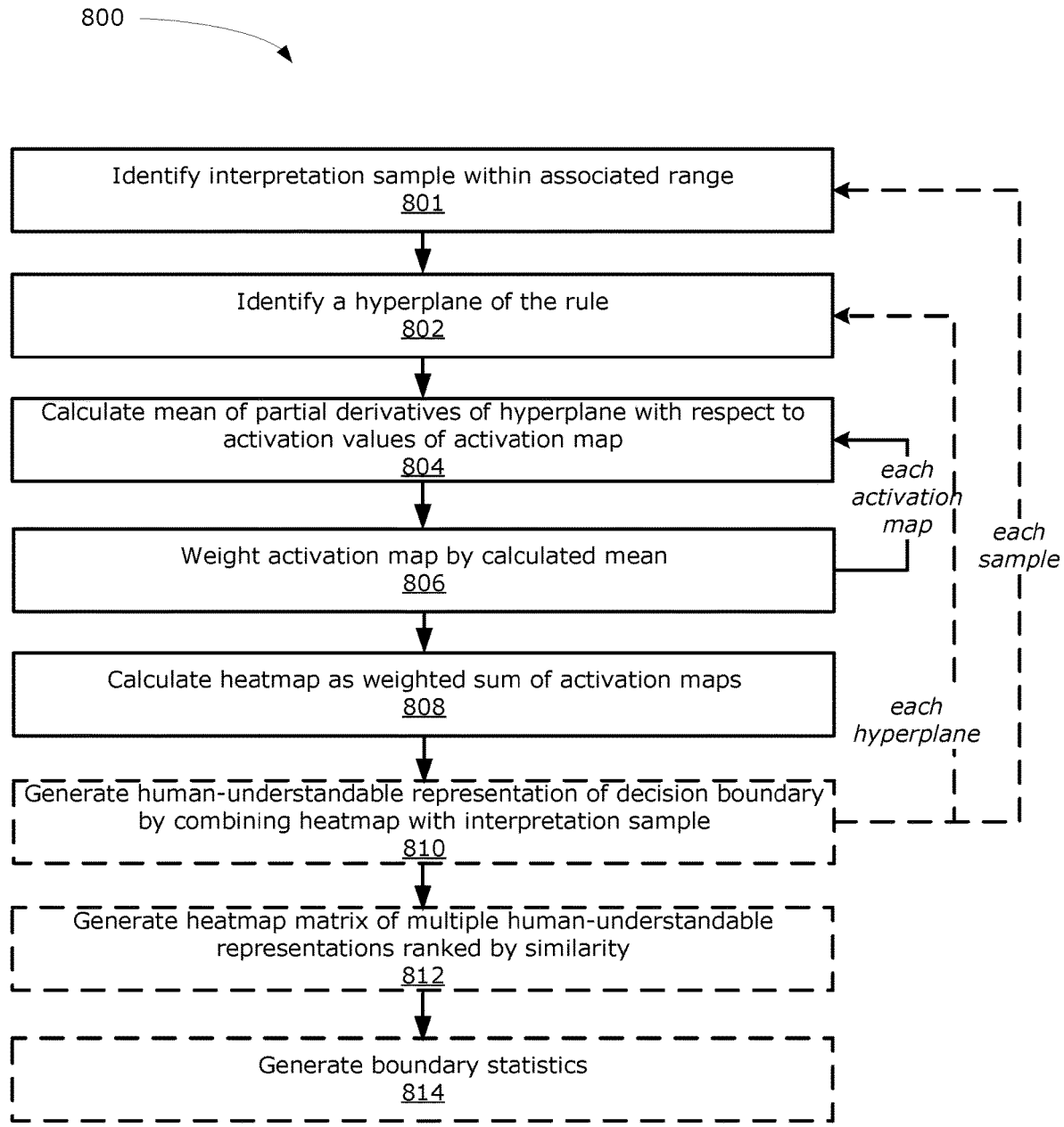
FIG. 8 is a flowchart of an example method for generating an interpretation of one or more of the rules generated by the method of FIG. 6.

FIG. 8 is a flowchart of an example interpretation method 800 for generating an interpretation of one or more of the rules generated by the single-rule extraction method 600 of FIG. 6A or the multi-rule extraction method 660 of FIG. 6D.

Notation and terminology used in describing method 800 will now be defined. x is an input sample 502 used to generate the human-understandable interpretation, called an interpretation sample. F is the DNN or model approximated by the DNN, e.g., DNN 500. One of the outputs of the DNN 500 used in this method 800 is the logits 516 generated by hidden layer 136. $F_{trunc}$ is the truncated portion 504, and may also denote an updated input sample 512 generated by the truncated portion 504. $F_{tail}$ is the tail portion 506, and may also denote the logits 516 generated by the hidden layer 136 of the tail portion 506. $X=F_{trunc}(x)$ is the updated interpretation sample. L is the number of activation maps included in updated interpretation sample X. K is the number of boundaries of the rule being interpreted. $H_1$, $H_2$, ..., $H_K$ are the boundaries (i.e. hyperplanes) of the rule. "Rule" refers to a convex polytope in the Euclidean space, with an associated label. "Applicable range" refers to the region enclosed by the rule. "Heatmap" refers to a single-channel image that has the same size as the interpretation sample, which is an image in this example. The pixel values of the heatmap are referred to as heat values, wherein the larger the value, the more important that pixel is to the rule being interpreted.

Using method 800, various useful outputs can be generated. One or more interpretations may be generated in the form of human-understandable representations of one or more respective decision boundaries of the rule: for example, a heatmap may be generated for each boundary of the rule for the interpretation sample, and each heatmap may be combined with the interpretation sample to generate human-understandable representations of the decision boundaries of the rule (such as those shown in FIGS. 3-4). A heatmap matrix (as shown in FIG. 3) may be generated using multiple interpretation samples, as long as the interpretation samples are all covered by the rule. A ranking may be provided based on how similar each interpretation sample is to a primary interpretation sample. In addition, boundary statistics may be generated that provide information regarding how each boundary of the rule performs, and the distribution of the boundaries' associated labels.

Method 800 begins with a rule generated by the single-rule extraction method 600.

At 801, an updated input sample 512 falling within the applicable range of the rule is identified. The updated input sample 512 is used as the interpretation sample to generate one or more heatmaps and/or human-understandable representations of the decision boundaries of the rule.

At 802, a hyperplane (i.e. decision boundary) is selected or identified from the plurality of hyperplanes of the rule. This decision boundary will be interpreted in a first iteration of steps 804 through 810 of the method 800.

At 804, the weight of an activation map $X^l$ of the updated interpretation sample is calculated. The weight is computed by taking the mean of partial derivatives of $W_k^T x + b_k$ with respect to $X^l$, i.e., computing a mean of the partial derivatives of the hyperplane with respect to each activation value of the activation map. The formula is $$w_l = \operatorname*{mean}_{i,j} \frac{\partial (W_k^T x + b_k)}{\partial X_{i,j}^l}.$$

The weight is set equal to the computed mean.

At 806, the computed weight is multiplied by the activation map $X^l$ to generate a weighted activation map. The method 800 may then repeat steps 804 and 806 for each of one or more additional activation maps of the updated interpretation sample (in this example, all activation maps).

At 808, a heatmap is generated by computed a sum of each activation map weighted by its respective weight. The heatmap represents a decision boundary corresponding to the hyperplane. In this example, the heatmap is a shrunken heatmap computed by the ReLU of the weighted sum of activation maps. The formula is:

(shrunken) heatmap=$\operatorname{ReLU}(\Sigma_{l=1}^{L} w_l X^l)$.

The shrunken heatmap may be scaled, in this example, to the original size of the input image as a further sub-step of step 808. This produces K heatmaps in total, thereby providing more than one interpretation as described above.

At 810, optionally, a human-understandable representation of the decision boundary based on the interpretation sample is generated as described in detail above with reference to FIGS. 3-4. The human-understandable representation may be, for example, an image modified by a heatmap or an image with a bounding box around a region of interest as shown in FIGS. 3-4.

Method 800 may repeat steps 802 through 808 or 802 through 810 to generate one or more additional heatmaps and/or human-understandable representations interpreting one or more additional decision boundaries of the rule.

Method 800 may also repeat steps 801 through 808 or 802 through 810 to generate one or more additional heatmaps and/or human-understandable representations interpreting one or more additional decision boundaries of the rule applied to one or more additional interpretation samples.

At 812, optionally, a heatmap matrix may be generated, with the various interpretation samples ranked by similarity to a first or primary interpretation sample. A heatmap matrix may resemble the matrix of images shown in FIG. 3, with the interpretation samples in each row and the human-understandable representations in each column. It requires returning to step 801 at least once to identify a new interpretation sample (i.e. a second row of the matrix) and may also involve returning to step 802 at least once for each interpretation sample to generate additional human-understandable representations after the first (i.e. to add more columns after the first two, the first column being the unmodified interpretation sample and the second column being the first human-understandable representation). The rows may be ordered based on similarity of the interpretation sample of that row to the interpretation sample of the first row.

To compute the similarity between a given interpretation sample $X_{other}$ and the first interpretation sample X, the formula:

$$\sum_{k=1}^{K} |W_k^T(X_{other} - X)|$$

may be used to define the level of similarity. The lower the value, the higher the similarity.

In some embodiments, a heatmap matrix or other display of human-understandable representations may caption, label, or otherwise identify each human-understandable representation, such as each image. An identifying label attached to each human-understandable representation may be used to identify the associated label of the corresponding decision boundary, i.e., the category that the decision boundary is trying to separate from the category within the associated range of the rule. Such information might be less meaningful in binary classification of new input samples (i.e. classification of input samples into a set of categories including only two categories), but it could be valuable in a multi-category (i.e. classification of input samples into a set of categories including more than two categories) setting.

At 814, optionally, boundary statistics may be generated, e.g., the form of a report, to understand the role of each boundary of the rule. The boundary statistics may include the order in which the boundaries were chosen in the greedy algorithm of step 646, the number of updated input samples separated by each boundary, and the distribution of the associated labels. The distribution of the associated labels may describe the effort spent on separating a specific category from the target category (i.e. the category enclosed by the rule).

In some embodiments, a single human-understandable representation may be generated based on an average or combination of more than one heatmap. In some embodiments, a single heatmap may be chosen for the human-understandable representation based on the first boundary chosen in the greedy algorithm of step 646. It will be appreciated that there are many other alternative ways to summarize multiple heatmaps into one.

Experimental data comparing the example embodiments described herein to other known approaches to deep neural network interpretation suggest that method 800 may be used to generate human-understandable visualizations or other representations of the classification behavior of a deep neural network that exhibit faithfulness, robustness, and comprehensiveness relative to other known approaches, and that may in some examples be generated before the deep neural network has been fully trained.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

Further aspects and examples of the present disclosure are presented in the Appendix attached hereto, the entirety of which is hereby incorporated into the present disclosure.

The invention claimed is:

1. A method for generating a simplified representation of a neural network trained to perform classification, the trained neural network comprising a truncated portion including one or more layers and a tail portion including one or more layers, the method comprising:
using the truncated portion to generate an updated input sample comprising one or more output activation maps based on the input sample; and
using the tail portion to generate a label classifying the input sample into a first category or a second category based on the one or more output activation maps; and
generating a rule, the rule comprising a convex polytope defined by a plurality of hyperplanes in a multi-dimensional Euclidean space defined based on the plurality of updated samples such that updated input samples falling within the convex polytope are likely to be classified in a first category by the trained neural network and updated input samples falling outside the convex polytope are likely to be classified in a second category by the trained neural network.

2. The method of claim 1, wherein:
the plurality of input samples comprises:
a seed sample classified by the trained neural network in the first category, the truncated portion generating an updated seed sample based on the seed sample; and
a number of contrasting input samples equal to a predetermined candidate pool size, each contrasting input sample being classified by the trained neural network in the second category, the truncated portion generating an updated contrasting sample based on each contrasting input sample; and
generating the rule comprises, for each updated contrasting sample:
performing a binary search between the updated seed sample and the updated contrasting sample to generate a basis value and a bias value;
computing a decision boundary between the first category and the second category based on the basis value and the bias value of the binary search, the decision boundary defining one of the plurality of hyperplanes.

3. The method of claim 2, wherein:
the plurality of input samples further comprises:
one or more positive samples, each positive sample being classified by the trained neural network in the first category, the truncated portion generating an updated positive sample based on each positive sample; and
one or more negative samples, each negative sample being classified by the trained neural network in the second category, the truncated portion generating an updated negative sample based on each negative sample; and
generating the rule further comprises, for each hyperplane:
generating a positive-sample binary matrix comprising, for each updated positive sample, a row of binary values, each binary value indicating whether the updated positive sample falls on a first side or second side of one of the hyperplanes, each column of the positive-sample binary matrix corresponding to a hyperplane;
generating a negative-sample binary matrix comprising, for each updated negative sample, a row of binary values, each binary value indicating whether the updated negative sample falls on a first side or second side of one of the hyperplanes, each column of the negative-sample binary matrix corresponding to a hyperplane; and
selecting the plurality of hyperplanes from the columns of the positive-sample binary matrix and the columns of the negative-sample binary matrix using submodular cost submodular cover optimization such that the number of hyperplanes in the plurality of hyperplanes defining the convex polytope of the rule is less than the predetermined candidate pool size.

4. The method of claim 3, wherein:
the positive-sample binary matrix further comprises a row of binary values corresponding to the updated seed sample; and
the negative-sample binary matrix further comprises a row of binary values corresponding to each updated contrasting sample.

5. A non-transitory computer-readable medium having instructions tangibly stored thereon, wherein the instructions, when executed by a processing system, cause the processing system to perform the method of claim 4.

6. The method of claim 1,
wherein the plurality of input samples comprises an interpretation sample classified by the trained neural network in the first category, the truncated portion generating an updated interpretation sample based on the interpretation sample,
the method further comprising generating an interpretation of the rule by:
identifying a hyperplane of the plurality of hyperplanes of the rule;
for each of one or more activation maps of the updated interpretation sample, each activation map comprising a plurality of activation values:
calculating a mean of the partial derivatives of the hyperplane with respect to each activation value of the activation map; and
setting a weight for the activation map equal to the calculated mean; and
generating a heatmap by calculating a sum of each activation map weighted by its respective weight, the heatmap representing a decision boundary corresponding to the hyperplane.

7. The method of claim 6, wherein each input sample is an image, the method further comprising generating a human-visible representation of the rule by combining the heatmap with the interpretation sample.

8. The method of claim 7, wherein combining the heatmap with the interpretation sample comprises generating an image comprising at least part of the interpretation sample with a visual indicator of a portion of the heatmap having a heat value above a salience threshold.

9. The method of claim 6, wherein generating a representation of the rule further comprises repeating the steps of:
identifying a hyperplane;
calculating a mean for each activation map;
setting a weight for each activation map; and
generating a heatmap
for each one or more of the remaining hyperplanes of the convex polytope of the rule.

10. The method of claim 1, wherein:
the steps of generating an updated input sample and generating a label are performed for each input sample of a first plurality of input samples to generate a first plurality of updated samples and a first plurality of labels;
the step of generating a rule is performed based on the first plurality of updated samples and a first plurality of labels, thereby generating a first rule;
the steps of generating an updated sample and generating a label are performed for each input sample of each of one or more additional pluralities of input samples to generate one or more additional pluralities of updated samples and one or more additional pluralities of labels; and
the step of generating a rule is performed based on one or more additional pluralities of updated samples and one or more additional pluralities of labels, thereby generating one or more additional rules, the first rule and the one or more additional rules jointly constituting a plurality of rules,
the method further comprising generating a multiple rule classifier comprising the plurality of rules.

11. A non-transitory computer-readable medium having instructions tangibly stored thereon, wherein the instructions, when executed by a processing system, cause the processing system to perform the method of claim 1.

12. A system comprising:
a processing system comprising one or more processor devices; and
a memory storing instructions which, when executed by the processing system, cause the system to generate a simplified representation of a neural network trained to perform a classification task on input samples, the trained neural network comprising a truncated portion including one or more layers and a tail portion including one or more layers, by:
using the truncated portion to generate an updated input sample comprising one or more output activation maps based on the input sample; and
using the tail portion to generate a label classifying the input sample into a first category or a second category based on the one or more output activation maps; and
generating a rule, the rule comprising a convex polytope defined by a plurality of hyperplanes in a multi-dimensional Euclidean space defined based on the plurality of updated samples such that updated input samples falling within the convex polytope are likely to be classified in a first category by the trained neural network and updated input samples falling outside the convex polytope are likely to be classified in a second category by the trained neural network.

13. The system of claim 12, wherein:
the plurality of input samples comprises:
a seed sample classified by the neural network in the first category, the truncated portion generating an updated seed sample based on the seed sample; and
a number of contrasting input samples equal to a predetermined candidate pool size, each contrasting input sample being classified by the neural network in the second category, the truncated portion generating an updated contrasting sample based on each contrasting input sample; and
generating the rule comprises, for each updated contrasting sample:
performing a binary search between the updated seed sample and the updated contrasting sample to generate a basis value and a bias value;
calculating a decision boundary between the first category and the second category based on the basis value and the bias value of the binary search, the decision boundary defining one of the plurality of hyperplanes.

14. The system of claim 13, wherein:
the plurality of input samples further comprises:
one or more positive samples, each positive sample being classified by the trained neural network in the first category, the truncated portion generating an updated positive sample based on each positive sample; and
one or more negative samples, each negative sample being classified by the trained neural network in the second category, the truncated portion generating an updated negative sample based on each negative sample; and
generating the rule further comprises, for each hyperplane:
generating a positive-sample binary matrix comprising, for each updated positive sample, a row of binary values, each binary value indicating whether the updated positive sample falls on a first side or second side of one of the hyperplanes, each column of the positive-sample binary matrix corresponding to a hyperplane;
generating a negative-sample binary matrix comprising, for each updated negative sample, a row of binary values, each binary value indicating whether the updated negative sample falls on a first side or second side of one of the hyperplanes, each column of the negative-sample binary matrix corresponding to a hyperplane; and
selecting the plurality of hyperplanes from the columns of the positive-sample binary matrix and the columns of the negative-sample binary matrix using submodular cost submodular cover optimization such that the number of hyperplanes in the plurality of hyperplanes defining the convex polytope of the rule is less than the predetermined candidate pool size.

15. The system of claim 14, wherein:
the positive-sample binary matrix further comprises a row of binary values corresponding to the updated seed sample; and
the negative-sample binary matrix further comprises a row of binary values corresponding to each updated contrasting sample.

16. The system of claim 12,
wherein the plurality of input samples comprises an interpretation sample classified by the trained neural network in the first category, the truncated portion generating an updated interpretation sample based on the interpretation sample,
the instructions, when executed by the processing system, further causing the system to generate an interpretation of the rule by:
identifying a hyperplane of the plurality of hyperplanes of the rule;
for each of one or more activation maps of the updated interpretation sample, each activation map comprising a plurality of activation values:
calculating a mean of the partial derivatives of the hyperplane with respect to each activation value of the activation map; and setting a weight for the activation map equal to the calculated mean; and generating a heatmap by calculating a sum of each activation map weighted by its respective weight, the heatmap representing a decision boundary corresponding to the hyperplane.

17. The system of claim 16, wherein each input sample is an image, the method further comprising generating a human-visible representation of the rule by combining the heatmap with the interpretation sample.

18. The system of claim 17, wherein combining the heatmap with the interpretation sample comprises generating an image comprising at least part of the interpretation sample with a visual indicator of a portion of the heatmap having a heat value above a salience threshold.

19. The system of claim 16, wherein generating a representation of the rule further comprises repeating the steps of:
    identifying a hyperplane;
    calculating a mean for each activation map;
    setting a weight for each activation map; and
    generating a heatmap
for each one or more of the remaining hyperplanes of the convex polytope of the rule.

20. The system of claim 12, wherein:
    the steps of generating an updated sample and a generating a label are performed for each input sample of a first plurality of input samples to generate a first plurality of updated samples and a first plurality of classifications;
    the step of generating a rule is performed based on the first plurality of updated samples and a first plurality of labels, thereby generating a first rule;
    the steps of generating an updated sample and a generating a label are performed for each input sample of each of one or more additional pluralities of input samples to generate one or more additional pluralities of updated samples and one or more additional pluralities of classifications;
    the step of generating a rule is performed based on one or more additional pluralities of updated samples and one or more additional pluralities of labels, thereby generating one or more additional rules, the first rule and the one or more additional rules jointly constituting a plurality of rules; and
    generating a multiple rule classifier comprising the plurality of rules.

* * * * *